United States Patent Office 3,796,728
Patented Mar. 12, 1974

3,796,728
STEROIDAL DERIVATIVES, METHODS FOR THEIR MANUFACTURE, AND COMPOUNDS PRODUCED THEREBY
Masato Tanabe, Palo Alto, Calif., assignor to Schering Corporation, Bloomfield, N.J.
No Drawing. Application June 20, 1967, Ser. No. 647,315, which is a continuation-in-part of application Ser. No. 644,761, June 6, 1967, now abandoned. Divided and this application Dec. 28, 1970, Ser. No. 102,095
Int. Cl. C07d 7/04
U.S. Cl. 260—345.9         17 Claims

ABSTRACT OF THE DISCLOSURE

Steroidal 5-keto-4,5-seco-3-ynes of the estrane, androstane, and pregnane series are prepared from 3-keto-4-dehydrosteroids via the 3-hydrocarbon-sulfonylhydrazono-4,5-oxido derivative thereof which undergoes fission and rearrangement in situ to form the 5-keto-4,5-seco-3-yne structure. The 6- and/or 10-hydrocarbon substituted-5-keto-4,5-seco-3-ynes are prepared by reacting a 6- and/or 10-unsubstituted-5-keto-4,5-seco - 3 - yne in an alkylating medium with a hydrocarbon sulfonate or, preferably, a hydrocarbon halide.

The steroidal 5-keto-4,5-seco-3-ynes of this invention are useful as intermediates in preparing pharmacologically valuable 6- and/or 10-hydrocarbon substituted-3-keto-4-dehydro steroids, e.g.

(1) by reaction with mercuric acetate and sulfuric acid in acetic acid; or (2) by reaction with mercuric oxide and trifluoroacetic acid followed by treatment of the thereby formed 3,5-diketo - 4,5 - seco steroid with potassium t - butoxide in t-butanol.

CROSS REFERENCE OF RELATED APPLICATIONS

This application is a division of copending application Ser. No. 647,315, filed June 20, 1967, which is a continuation-in-part of application Ser. No. 644,761, filed June 6, 1967, now abandoned.

FIELD OF INVENTION

This invention relates to compositions of matter which may be classified in the field of chemistry as 3'-keto-2'-3'-seco-1'(2')-yne steroidal derivatives possessing physiological activity, and which are also particularly valuable as intermediates in preparing other useful steroidal derivatives.

This invention also relates to processes for producing the novel 3'-keto-2',3'-seco-1'(2')-yne steroids, the basic process of which includes the steps whereby a 1'-keto-2'(3')-dehydro steroid wherein the 3'-carbon is disubstituted is converted to the corresponding 1'-hydrocarbonsulfonyl-hydrazono-2',3'-epoxy steroidal derivative, which derivative undergoes fission and rearrangement in situ in the reaction mixture to form a novel 3'-keto-2',3'-seco-1'(2')-yne steroidal compound of my invention.

SUMMARY OF INVENTION

The invention sought to be patented in its composition of matter aspect resides in the concept of a steroid (including steroids of the pregnane, androstane, estrane, cholestane, and sapogenin series) which possesses a 3'-keto-2',3'-seco-1'(2')-yne system or the corresponding 3'-hydroxy-2',3'-seco-1'(2')-yne system.

The preferred species of the composition of matter aspect of my invention are the 5-keto-4,5-seco-3(4)-yne steroidal derivatives (particularly of the androstane, estrane, and pregnane series) which possess physiological activity, and which are particularly valuable as intermediates in preparing pharmacologically active 3-keto-4-dehydro-steroids (many of which are known in the art) substituted at C-4 by a lower alkyl, or substituted at C-6 by a mono-, di-, or cyclic-hydrocarbon radical (including substituted hydrocarbon radicals) and/or at C-10 by a hydrocarbon radical.

GENERAL DESCRIPTION OF THE PRODUCT ASPECT OF THE INVENTION

The invention sought to be patented in its broadest composition of matter aspect is the concept of a steroid (including members of the pregnane, androstane, estrane, cholestane and sapogenin series) which possess a 3-keto-2',3'-seco - 1'(2') - yne system or the corresponding 3'-hydroxy-2',3'-seco-1'(2')-yne system, and which may also possess hydrocarbon substituents having up to 12 carbon atoms on one or more carbon atoms adjacent said 5'-keto moiety.

In view of their method of manufacture, as discussed in detail hereinbelow, by my inventive concept, seco-steroids of this invention are contemplated as possessing the requisite 3'-keto-2',3'-seco-1'(2')-yne system (or 3'-hydroxy analog thereof) at any of those positions wherein it is known that a normal steroid may possess a 1'-keto-2',3' - dehydro system, (i.e. an $\alpha,\beta$ - unsaturated keto-system) and a tertiary carbon at C-3'. The concept of the composition of matter aspect of my invention thus includes the following species:

(a) 1,2-seco-3(2)-yne-1-one steroidal derivatives (particularly steroids of the androstane and pregnane series as exemplified by 1,17α-dimethyl-1,2-seco-3(2) - androstyn-17β-ol.

(b) 5,6-seco-7(6)-yne-5-one derivatives (particularly of the estrane, androstane, pregnane and cholestane series) as exemplified by 3β-acetoxy-5,6-seco-3-dehydro-7-cholestyn-5-one. These derivatives are useful intermediates in my second process aspect for introducing alkyl groups at C-4 and/or (when there is a 19-nor-steroid) at C-10.

(c) 7,8-seco-6(7)-yne-8-one derivatives (particularly of the estrane, androstane, pregnane, cholestane and lumistane series) as exemplified by 3β-acetoxy-5β-hydroxy-7,8-seco-22-dehydro-6-lumistyn-8-one.

These derivatives are useful intermediates for the second process aspect for introducing alkyl groups at C-9 and C-14, and also for making C-9-iso- and C-14-iso-stereo-isomeric derivatives.

(d) 9,11-seco-12(11)-yne-9 - one derivatives (particularly of the pregnane, cholestane, and sapogenin series) exemplified by 9,11-seco-22α,25a-11-spirostyn-3β-ol-9-one 3-acetate.

(e) 14,15-seco-17(16) - yne - 14 - one derivatives (particularly of the androstane, estrane, and pregnane series) exemplified by 3β-acetoxy-14,15-seco-16 - androstyn ‑ 14-one. These derivatives are useful as intermediates in the second process aspect of this invention to introduce alkyl groups at C-8. Compounds of Formula Ie may also be converted to form C-8-iso-steroisomeric derivatives.

(f) The preferred species, i.e. the 5-keto-4,5-seco-3(4)-yne steroidal derivatives (particularly steroids of the androstane, pregnane, and cholestane series) as exemplified by 4,5-seco-3-androstyn-17β-ol-5-one
4,5-seco-3-estryn-17β-ol-5-one
4,5-seco-3-cholestyn-5-one
4,5-seco-3-pregnyn-17α-ol-5,20-dione and
4,5-seco-3-pregnyn-17α,21-diol-5,20-dione.

The above listed species are indicated diagrammatically below in Chart A wherein R is a member selected from the group consisting of hydrogen and methyl and R' represents a member selected from the group consisting of hydrogen and a hydrocarbon radical having up to 12 carbon atoms. It is understood that other functions, particularly at C-3 and C-17, may be present in the molecule.

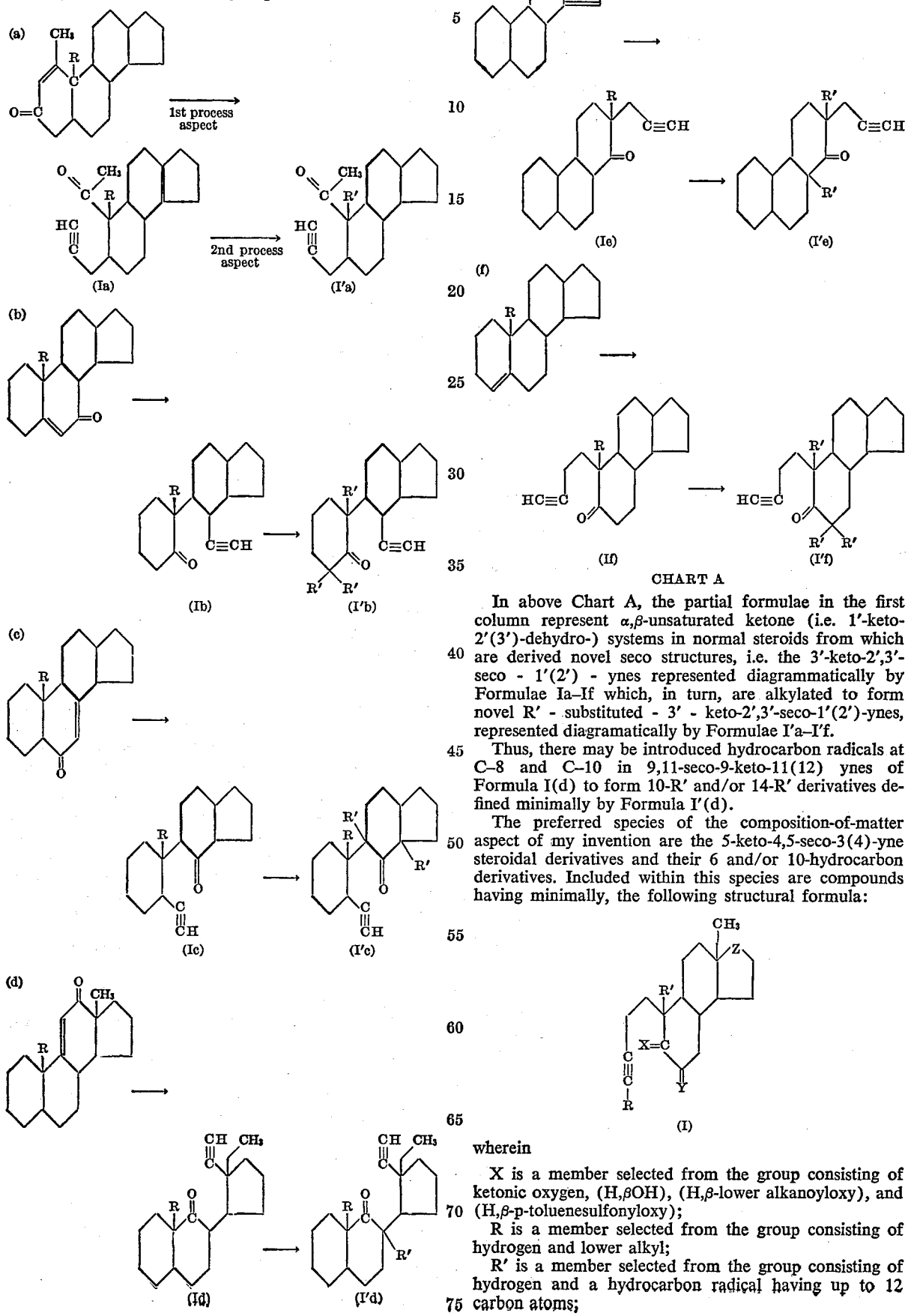

CHART A

In above Chart A, the partial formulae in the first column represent α,β-unsaturated ketone (i.e. 1'-keto-2'(3')-dehydro-) systems in normal steroids from which are derived novel seco structures, i.e. the 3'-keto-2',3'-seco - 1'(2') - ynes represented diagrammatically by Formulae Ia–If which, in turn, are alkylated to form novel R' - substituted - 3' - keto-2',3'-seco-1'(2')-ynes, represented diagramatically by Formulae I'a–I'f.

Thus, there may be introduced hydrocarbon radicals at C-8 and C-10 in 9,11-seco-9-keto-11(12) ynes of Formula I(d) to form 10-R' and/or 14-R' derivatives defined minimally by Formula I'(d).

The preferred species of the composition-of-matter aspect of my invention are the 5-keto-4,5-seco-3(4)-yne steroidal derivatives and their 6 and/or 10-hydrocarbon derivatives. Included within this species are compounds having minimally, the following structural formula:

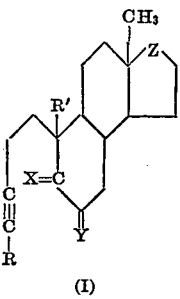

(I)

wherein

X is a member selected from the group consisting of ketonic oxygen, (H,βOH), (H,β-lower alkanoyloxy), and (H,β-p-toluenesulfonyloxy);

R is a member selected from the group consisting of hydrogen and lower alkyl;

R' is a member selected from the group consisting of hydrogen and a hydrocarbon radical having up to 12 carbon atoms;

Y is a member selected from the group consisting of hydrogen,

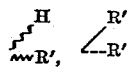

a polymethylene cyclic radical having from 2 to 8 carbon atoms (H,β-formyl), and n-lower alkylthiomethylene; and Z is a member selected from the group consisting of keto,

(W being a member selected from the group consisting of hydrogen, lower alkyl, tetrahydropyranyl, lower alkanoyl, and A being a member selected from the group consisting of hydrogen, and lower alkyl,

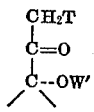

(T being a member selected from the group consisting of hydrogen and —OW', and W' being a member selected from the group consisting of hydrogen and lower alkanoyl.)

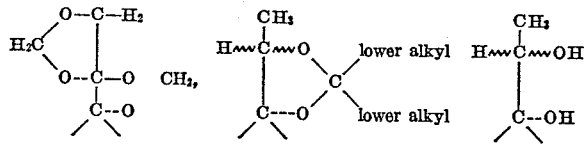

and

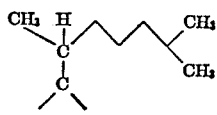

Included within the term "lower alkyl" as used in the specification and claims are saturated hydrocarbon radicals having up to four carbon atoms including straight chain and branched radicals such as methyl, ethyl, n-propyl, isopropyl, n-, iso- and tert.-butyl.

The term hydrocarbon radical having up to 12 carbon atoms as used in the specification and claims encompasses saturated alkyl radicals, both straight chain and branched, having up to 12 carbon atoms such as methyl, octyl, n-dodecyl and like, unsaturated open chain radicals such as 2'-propenyl-, and 3'-butenyl; and cyclic hydrocarbon radicals such as cyclopropylethyl, cyclobutylmethyl, cyclopentyl; as well as, at C-6, spiro-cyclic hydrocarbon radicals which includes within the spiro ring structure the seco-steroid carbon at C-6, e.g. 6,6-dimethylene (i.e. 6-spiropropane or 6,6-ethylene) 6,6-trimethylene (i.e. 6-spirobutane), and 6,6-pentamethylene (i.e. spirohexane), and the like.

Typical compounds of the preferred species of the composition of matter aspect of my invention which are defined by above Formula I include:

(1) 6 and 10 unsubstituted seco-steroidal derivatives of the estrane series (i.e. wherein R' and Y are hydrogen) such as:

4,5-seco-3-estryn-17β-ol-5-one and the 17-acetate ester and the 17-tetrahydropyranyl ether thereof (i.e. compounds wherein Z is

A being hydrogen, and X being oxygen);

(2) 6-unsubstituted-10β-alkyl- and 6-unsubstituted 10β-alkylene seco steroidal derivatives (i.e. wherein Y is hydrogen and R' is a hydrocarbon radical) of the androstane, pregnane, and cholestane series, such as 4,5-seco-3-androstyn-17β-ol-5-one (Z is

R' is methyl, and X is oxygen) and the 17-acetate ester and 17-tetrahydropyranyl ether thereof; as well as 3β-enol acetate 17-acetate thereof (compound of Example 13A);

4,5-seco-3-androstyne-5,17-dione (Z is keto, R' is methyl, and X is oxygen),

10β-n-propyl-4,5-seco-3-estryn-17β-ol-5-one (i.e. R' is n-propyl, X is oxygen, and Z is

4,5-seco-3-androstyn-5,17β-diol (X is

R' is methyl, R is hydrogen, and Z is

and the 3-p-toluenesulfonate ester thereof;

(3) 6-substituted-10-unsubstituted seco steroids (i.e. R' is hydrogen, Y is formyl or 6-n-butylthiomethylene) exemplified by 6-formyl-4,5-seco-3-estryn-17β-ol-5-one 17-tetrahydropyranyl ether (a compound wherein R and R' are hydrogen, X is oxygen, Y is formyl, and Z is

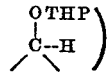

and 6-n-butylthiomethylene-4,5-seco-3-estryn-17β-ol-5 - one 17-tetrahydropyranyl ether (a compound wherein Y is n-butylthiomethylene);

(4) and 6 and 10-di- and tri-substituted compounds (i.e. both R' and Y are other than hydrogen) as exemplified by 6,6-dimethyl-4,5-seco-3-androstyn-17β-ol-5-one (i.e. R is H, R' is methyl, Y is

and Z is

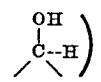

and the 17-acetate ester, 17-methyl ether and 17-tetrahydropyranyl ether thereof;

6,6-di-(2'-propenyl)-4,5-seco-3-androstyn-17β-ol-5 - one and the 17-tetrahydropyranyl ether thereof (i.e. R is H, R' is methyl, X is oxygen, Y is

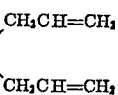

and Z is

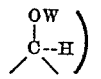

6,6-pentamethylene-4,5-seco-3-androstyn-17β-ol and the 17-tetrahydropyranyl ether thereof, (i.e. R is H, R' is methyl, X is oxygen, Y is

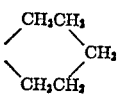

and Z is

6,10β-di-(2'-propenyl)-4,5-seco-3-estryn-17β-ol-5 - one 17-tetrahydropyranyl ether (R is H, X is oxygen, R' is 2'-propenyl, Y is

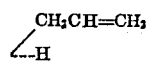

and Z is

6,6,10β-tri-(2'-propenyl)-4,5-seco-3-estryn-17β-ol-5-one 17-tetrahydropyranyl ether (R is H, X is oxygen, R' is 2'-propenyl, Y is

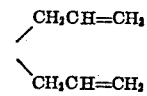

and Z is

6-n-butylthiomethylene-10β-n-dodecyl-4,5-seco-3-estryn-17β-ol-5-one (R is H, X is oxygen, R' is n-dodecyl, Y is n-butylthiomethylene and Z is

Utility of 4,5-seco compounds of this invention

The 3'-keto-2',3'-seco-1'-(2')-yne-steroids of my invention such as those represented diagrammatically by Formulae I (a–f) and I' (a–f) in Chart A above, are useful mainly as intermediates in preparing new, substituted derivatives of the α,β-keto-steroids from whence they are derived (as represented diagrammatically by the formulae listed in the first column n Chart A) via procedures discussed hereinbelow. Thus, utilizing compounds represented by Formulae Ia and I'a, there are formed 1-methyl-10β-hydrocarbon (having up to 12 carbon atoms) substituted-3-keto-1-dehydro steroids;

from seco-compounds represented by Formulas Ib and I'b, there are derived 7-keto-5-dehydro streoids substituted at C–10 and/or at C–4 by hydrocarbon radicals having up to 12 carbon atoms;

from seco-compounds represented by Formulae Ic and I'c there are derived 6-keto-7-dehydro steroids substituted at 9 and/or at C–14 by hydrocarbon radicals having up to 12 carbon atoms;

from seco compounds represented by Formulae Id and I'd there are derived 12-keto-9(11)-dehydro steroids substituted at C–10 and/or at C–8 by a hydrocarbon radical having up to 12 carbon atoms;

from seco compounds represented by Formulae Ie and I'e, there are derived 16-keto-14-dehydro steroids substituted at C–8 by a hydrocarbon having up to 12 carbon atoms, from the preferred seco compounds of this invention as represented by Formulae If and I'f in Chart A (and by Formula I above), there are derived 6 and/or 10-substituted steroidal derivatives which are further discussed hereinbelow.

The 6-unsubstituted 4,5-seco - 3 - estryn-5-ones and the 4,5-seco-3-androstyn-5-ones of the preferred species of the composition of matter aspect of my invention, in particular those compounds wherein Z is

and esters thereof, possess anti-androgenic activity. For example, when tested in the rat via the subcutaneous route, 4,5-seco-3-androstyn-17β-ol-5-one exhibited anti-androgenic activity at dosages about 10 mgm./kilogram and 4,5-seco - 3 - estryn-17β-ol-5-one exhibited anti-androgenic activity in doses as low as 1 mgm./kilogram body weight. The 6-unsubstituted 4,5-seco-3-androstyn-5-one and the 6-unsubstituted 4,5-seco-3-estryn-5-ones are valuable in treating conditions which require an anti-androgen, e.g. in the treatment of benign prostatic hypertrophy in dogs.

The 4,5-seco - 3 - yne-5-ones such as those defined by Formula I (and Formulae If and I'f in Chart A) are useful mainly as intermediates via novel processes disclosed hereinbelow for the preparation of new steroid compounds as well as known, pharmacologically valuable steroids of the pregnane and androstane series including (1) 6-unsubstituted - 10β - higher alkyl analogs of the pregnane and androstane series such as described in U.S. Pats. Nos. 3,309,386 and 3,309,387, and in French Pat. No. 1,146,640.

Of these, by way of example, the A-ring-unsaturated 10β-n-propyl-androstenes (i.e. A-ring unsaturated -19-vinyl-androstenes) as examplified by 10β-n-propyl-4-estrene-17β-ol - 5 - one (prepared via the novel compounds and processes of this invention as described in Examples 16, 20, and 21) and described in U.S. Pat. No. 3,309,386, useful as gonadotropin-inhibiting agents.

(2) 6-spiroalkane derivatives (i.e. 6,6-cyclicpolymethylene derivatives) of steroids of the androstane and estrane series such as described and claimed in South African Pat. No. 66/5,332 and Netherlands application 6603861, and the 6-spiroalkane pregnanes in Netherlands application Nos. 6603861 and 6603864, in British Pat. No. 1,066,729, and in South African Pat. No. 66/1,036.

(3) in preparing 4,5-seco-3,5-dione analogs of the androstane and pregnane series some of which are known useful compounds, such as 4,5-seco-9-estryn-17β-ol-3,5-dione 17-acetals described in Belgian Pat. No. 592,003, a useful intermediate to prepare 19-nor-9-dehydro-testosterone acetate; and 4,5-set seco-19-nor-9-pregnene-3,5,20-trione described in U.S. Pat. No. 3,155,660 as a useful intermediate in the preparation of 19-nor-9-dehydroprogesterone.

The value of the 3'-keto-2'3'-seco-1'(2')-ynes of my invention as intermediates, is based upon my discovery that my novel 4,5 - seco-5-keto-3-ynes may be readily ring closed to form normal 3-keto-Δ⁴-steroid compounds via either a direct, one-step, method by the action of mercuric acetate and sulfuric acid in acetic acid as solvent at reflux temperature for about two hours; or, alternatively via a two step procedure wherein a 5-keto-4,5-seco-3-yne of the general Formula I above upon treatment at room temperature for about an hour with mercuric oxide and trifluoroacetic acid in aqueous dioxane as solvent is converted to another class of 4,5-seco compounds (some species of which are known in the art), i.e. the 3,5-diketo-4,5-seco steroids which, upon treatment with potassium tert.-butoxide in butanol, at reflux temperature for about three hours, are ring closed to a steroid of normal configuration. Both of these ring closure processes wherein my novel compounds are the requisite starting compounds, are illustrated diagramatically below via flow diagram, A being the remaining portion of steroid molecule of the androstane and pregnane series:

Ring Closure Process A:

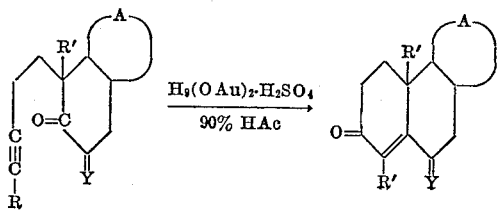

Ring Closure Process B:

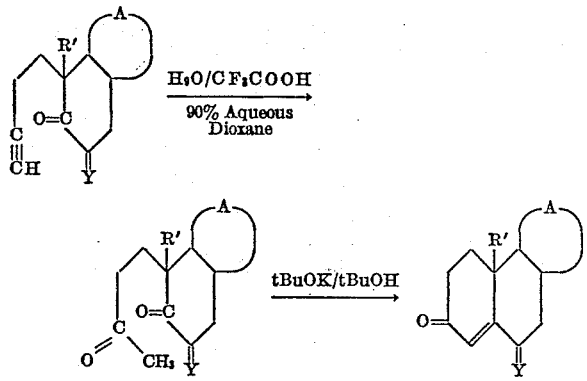

Examples 4-(Procedure 1), 12B, 17 and 27D of this application illustrate the novel ring closure process A. In these examples, 4,5-seco-3-androstyn-17β-ol-one, 4,5-seco-3-androstyn - 5,17 - dione, 4,5-seco-3-estryn-17β-ol-5-one 17 acetate and 6-n-butylthiomethylene-4,5-seco-3-androstyn-17β-ol-5-one are each treated with mercuric acetate and sulfuric acid in aqueous dioxane to form, respectively testosterone, 4-androstene-3,17-dione, 19-nor-testosterone acetate, and 6-n-butylthiomethylene testosterone 17-acetate.

Examples 4 (Procedure 2), 6, 9, 11, 14, 15, 21, 23 and 25 (B–F), of this application illustrate ring closure Procedure B. In these examples, each of the following compounds of my invention:

(1) 4,5-seco-3-androstyn-17β-ol-5-one
(2) 6,6-dimethyl-4,5-seco-3-androstyn-17β-ol-5-one 17-methyl ether
(3) 6,6-di-(2'-propenyl)-4,5,-seco-3-androstyn-17β-5-one
(4) 6,6-pentamethylene-4,5-seco-3-androstyn-17β-ol-5-one
(5) 6,6-dimethyl-4,5-seco-3-androstyn-17β-ol-5-one 17-acetate
(6) 10βn-propyl-4,5-seco-3-estryn-17β-ol-5-one
(7) 6,10-di-(2'-propenyl)-4,5-seco-3-estryn-17β-ol-5-one
(8) 6,6,10-tri-(2'-propenyl)-4,5-seco-3-estryn-17β-ol-5-one 17-tetrahydropyranyl ether
(9) 6-n-butylthiomethylene-10-n-dodecyl-4,5-seco-3-estryn-17β-ol-5-one upon reaction with mercuric oxide and trifluoroacetic acid in aqueous dioxane are converted to the corresponding 3,5-diketo-4,5-seco-derivative, respectively, i.e.

(1) 4,5-seco-3-androstan-17β-ol-3,5-dione
(2) 6,6-dimethyl-4,5-seco-3-androstan-17β-ol-3,5-dione 17-methyl ether
(3) 6,6-di-(2'-propenyl)-4,5-seco-3-androstan-17β-ol-3,5-dione
(4) 6,6-pentamethylene-4,5-seco-3-androstan-17β-ol-3,5-dione
(5) 6,6-dimethyl - 4,5 - seco-3-androstan-17β-ol-3,5-dione 17-acetate
(6) 10β-n-propyl-4,5-seco-3-estran-17β-ol-3,5-dione
(7) 6,10β-di-(2'-propenyl) - 4,5 - seco-3-estran-17β-ol-3,5-dione
(8) 6,6,10β-tri-(2'-propenyl)-4,5-seco-3-estran-17β-ol-3,5-dione 17-tetrahydropyranyl ether
(9) 6-n-butylthiomethylene - 10 - n - dodecyl-4,5-seco-3-estran-17β-ol-3,5-dione.

In the second step of Ring Closure Process B, each of the foregoing compounds in turn upon treatment with potassium tert.-butoxide in tert.-butanol is ring closed to form the following 3-keto-Δ⁴-steroids, respectively (1) testosterone
(2) 6,6-dimethyltestosterone 17-methyl ether,
(3) 6,6-di-(2'-propenyl)-testosterone,
(4) 6,6-pentamethylene-testosterone,
(5) 6,6-dimethyltestosterone 17-acetate,
(6) 10β-n-propyl-19-nortestosterone,
(7) 6,10β-di-(2'-propenyl)-19-nortestosterone,
(8) 6,6,10β-tri-(2'-propenyl)-19-nortestosterone 17-tetrahydropyranyl ether,
(9) 6-n-butylthiomethylene-10-n-dodecyl-19-nortestosterone.

GENERAL DESCRIPTION OF THE PROCESS ASPECTS OF THE INVENTION FIRST PROCESS ASPECT

The invention sought to be patented in its broadest process aspect is based upon my discovery that when there is introduced into a 1'-keto-2',3'-dehydro steroid (i.e. a steroid possessing an α,β-unsaturated keto system) having a tertiary carbon at the 3'-position, both a hydrazone derivative and preferably a hydrocarbonsulfonylhydrazone derivative of the 1'-keto and an epoxy function across the 2',3'-double bond, the 1'-hydrazono-2',3'-epoxy steroidal derivative thereby formed undergoes fission between C–2' and C–3' with concomitant fragmentation and rearrangement in situ in the reaction mixture, either immediately, or upon standing at room temperatures, or upon heating at moderate temperatures in the range of from about 35° C. to about 75° C., to form a novel class of compounds, i.e. the 3'-keto-2',3'-seco-1'(2')-yne steroids of the composition of matter aspect of this invention. I have discovered, further, that this reaction is of a general nature, and that formation of a 1'-hydrocarbonsulfonylhydrazone - 2',3' - epoxy derivative of any 1'-keto-2',3'-dehydro system present in the steroid molecule, e.g. such as the 3-keto-Δ¹-, 3-keto-Δ⁴-, 7-keto-Δ⁵-, 12-keto-Δ⁹⁽¹¹⁾-6-keto-Δ⁷-, and 16-keto-Δ¹⁴ moieties will result in fission between C–2' and C–3' and the formation of a 3'-keto-2',3'-seco-1'(2')-yne steroid, provided the carbon at C–3' is tertiary.

Thus (with reference to Chart A), when each of

1α,17α-dimethyl testosterone (i.e. Δ¹-3-keto)
3-acetoxy-3,5-cholestadiene-7-one (i.e. Δ⁵-7-keto),
3β-acetoxy-5β-hydroxy-7,22-lumis-tadiene-6-one (i.e. Δ⁷-6-keto),
9(11)-dehydrohecogenin-3-acetate (i.e. Δ⁹⁽¹¹⁾-12-keto),
3β-acetoxy-14-androstene-16-one (i.e. Δ¹⁴-16-keto), and testosterone (Δ⁴-3-keto)

are converted to the corresponding hydrazono-epoxy derivatives, e.g.

3-p-toluene-sulfonylhydrazono - 1,2 - oxido - 1α,17α - dimethylandrostan-17β-ol,
3-acetoxy - 5,6 - oxido - 7 - p - toluenesulfonylhydrazono-3-cholestene,
3β-acetoxy - 5β - hydroxy-6-p-toluenesulfonylhydrazono-7,8-oxido-22-lumistene,
9,11 - oxido-hecogenin 3 - acetate 12-p-toluenesulfonylhydrazone,
14,15-oxido-16 - p - toluenesulfonylhydrazono-androstane and 3-p-toluenesulfonylhydrazono - 4,5 - oxido-androstan-17β-ol, fission and rearrangement of each of the foregoing derivatives occurs and there are formed seco-steroid compounds of my invention, e.g.

1,17α-dimethyl-1,2-seco-3-androstyn-17β-ol-1-one
3-acetoxy-5,6-seco-3-dehydro-7-cholestyn-5-one
3β-acetoxy-5β-hydroxy - 7,8 - seco-22-dehydro-6-lumistyn-8-one
9,11-seco - 22α,25α - 11 - spirostyn-3β-ol-9-one 3-acetate
3β-acetoxy-14,15-seco-16-androstyn-14-one and
4,5-seco-3-androstyn-17β-ol-5-one,
respectively.

The preferred mode of carrying out my process is that wherein a 3-keto-Δ⁴ steroid is utilized as starting compound (e.g. testosterone) and there is prepared a 4,5-seco-5-keto-3-yne steroid of this invention (e.g. 4,5-seco-3-androstyn-17β-ol-5-one).

Discussed in detail below is the manner of carrying out the physical embodiments of the preferred species of the process aspect of this invention, it being understood that, in similar manner, any α,β-unsaturated keto steroid can be reacted by my process to form a 3'-keto-2',3'-seco-1'(2')-yne steroid of this invention.

In carrying out my process, known techniques for preparing the epoxy and hydrazone derivatives are used. It is immaterial, furthermore, whether the epoxy function or hydrazone derivative is introduced first into the molecule, although I have found it more convenient to first prepare the epoxy derivative, or to use a known α-epoxy-β-keto steroid as a starting compound.

Thus to prepare 4,5-seco-3-androstyn-17β-ol-5-one (Compound 1, R=CH₃) or to prepare 4,5-seco-3-estryn-17β-ol-5-one (Compound I', R is hydrogen) by my process, one can utilize either one of the sequences of reactions shown in below Chart B, i.e. (1) by first treating testosterone (or 19-nor-testosterone) with a known epoxidizing reagent (such as alkaline hydrogen peroxide) followed by treatment of the thereby formed 4,5-oxidoandrostan-17β-ol-3-one (or 4,5-oxido-estran-17β-ol-3-one) with a hydrocarbonsulfonylhydrazine (preferably p-toluenesulfonylhydrazine) in a lower alkanol according to standard procedures for making hydrazone derivatives of ketones or (2) alternatively, by first reacting testosterone (or 19-nor-testosterone) with p-toluenesulfonylhydrazine in ethanol followed by treatment of the thereby formed 3-p-toluenesulfonylhydrazone-4-androsten-17β-ol (or, when R is H, 3-p-toluenesulfonylhydrazono-4-estren-17β-ol) with an epoxidizing reagent, e.g. a per-acid such as m-chlorperbenzoic acid in methylene chloride. The steric configuration of the epoxy group at C-4,5 is immaterial to my process. Both the 4α,5α-oxido- and the 4β,5β-oxido intermediates 2ab undergo fission and rearrangement to form the 4,5-seco-5-keto-3-ynes of Formula I'.

In both procedures (1) and (2) shown in Chart B, the reaction mixtures in which intermediary products 2a, b (and thence seco steroids I') are being formed are stirred at room temperature for relatively long periods of time, i.e. 9 hours in procedure (1) and 17 hours in procedure (2). When carrying out my process for the first time on an α,β-unsaturated steroid, it is desirable to take aliquots of the reaction mixture at intervals to determine via thin layer chromatographic and spectral data the progress of the reaction as evidenced by the amount of starting products (1a) or (1b) remaining in the reaction mixture.

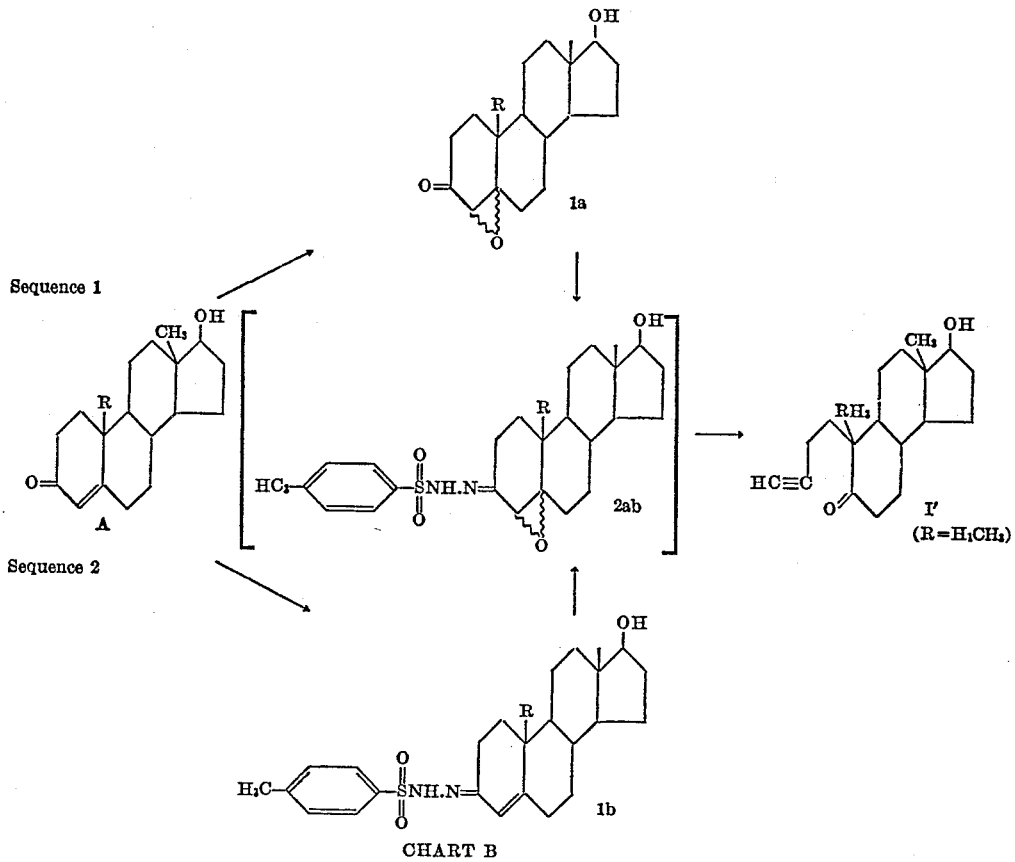

CHART B

The products (I) formed by my process, i.e. 4,5-seco-3-androstyn-17β-ol-5-one (when R is CH₃) and 4,5-seco-3-estryn-17β-ol-5-one (when R is H), via either of the above sequence of reactions, are conveniently isolated by treatment with water followed by extraction into an organic solvent. These products can be purified utilizing any of several techniques known in the art including, in particular, column and thin layer chromatography.

In carrying out the basic steps of my process as described in above procedures (1) and (2) (Chart B) whereby testosterone (Compound A wherein R is CH₃) is converted to 3,4-seco-3-androstyn-17β-ol-5-one (Compound I, R is methyl) there are used techniques similar to those known in the art. Thus, to prepare the hydrocarbonsulfonylhydrazone derivatives, e.g. product 1b a steroid having a keto moiety is usually dissolved in a lower alkanol to which is added at least a molar equivalent of a hydrazine and usually a hydrocarbonsulfonylhydrazine, preferably p-toluenesulfonylhydrazine and methanesulfonylhydrazine. Other sulfonylhydrazines may also be employed, such as ethanesulfonylhydrazine, benzenesulfonylhydrazine, napthalene-β-sulfonylhydrazine, ortho-toluenesulfonylhydrazine, meta-toluenesulfonylhydrazine, and, 3,4-xylenesulfonylhydrazine.

Similarly, the epoxy function is introduced utilizing techniques known in the art as those utilizing alkaline tertiary alkyl hydroperoxides, such as t-butyl hydroperoxide, t-cumyl hydroperoxide, or by utilizing a per acid such as perbenzoic, perphthalic, m-chloroperbenzoic acid, and the like, in an inert solvent.

I have found it desirable when carrying out my process to utilize a per acid (e.g. perbenzoic acid) in an inert solvent, (e.g. methylene chloride) when introducing the epoxy function after the hydrazone derivative has been made; whereas alkaline hydrogen peroxide is my choice of epoxidizing reagent when introducing the epoxy group prior to the hydrazone derivative.

It is usually preferable to carry out my process under an atmosphere of an inert gas, such as argon or nitrogen.

Second Process Aspect whereby groups are introduced on carbons vicinal the 3-carbon of the starting 1-keto-2,3-dehydro steroid which, in the cast of the preferred species of this invention relates to the introduction of groups at C–6 and/or C–10.

Described above is a preferred mode of the basic first process aspect of my invention whereby a 3-keto-4-dehydro-steroid (e.g. testosterone and 19-nor-testosterone) upon epoxidation across the $\Delta^4$-bond and preparation of the p-toluenesulfonylhydrazone derivative of the 3-keto, is converted to form a 5-keto-4,5-seco-3-yne, product I, of my invention (e.g. 4,5-seco-3-androstyn-17$\beta$-ol-5-one and 4,5-seco-3-estryn-17$\beta$-ol-5-one, respectively).

Second process aspect

In a second process aspect of my invention, 4,5-seco-3-yne-5-ones (prepared by the above described first process aspect), are further reacted in an alkylating medium (such as those utilizing sodium hydride in tetrahydrofuran, butyl lithium in ethylene glycol dimethyl ether, or an alkali metal alkoxide in alkanol, e.g. potassium tert. butoxide in butanol or sodium methoxide in benzene, with a hydrocarbon sulfonate or, preferably, hydrocarbon halide, including alkyl halides, aralkyl halides, alkenyl halides, e.g. methyl iodide, whereby (depending upon the quantity of reagent and the reaction conditions employed, in particular, temperature and length of reaction) any replaceable hydrogens on C–6 and/or C–10 are substituted by the hydrocarbon radical of said hydrocarbon halide (e.g. methyl) and there may be formed, for example, 6-methyl, 6,6-dimethyl, 10-methyl, 6,10-dimethyl or 6,6,10-trimethyl analogs of the starting 4,5-seco-3-yne-5-ones.

In carrying out the alkylating reactions of the second process aspect of my invention, it is preferable to protect any groups which might enter into a reaction with the reagents being employed. Thus, prior to subjecting the seco steroids to an alkylating agent according to this second process aspect of my invention, any secondary hydroxy groups present, such as at C–17, are protected either by esterification thereof or by preparation of the tetrahydropyranyl ether function.

The second process aspect of my invention is based upon my discovery that, by utilizing alkylating techniques, hydrocarbon substituents may be introduced into the 6' and/or 10 positions of my novel 4,5-seco-5-keto-3-yne steroidal derivatives and that the C–10 tertiary hydrogen (when present) will alkylate prior to the secondary hydrogens at C–6. Furthermore, introduction of the second hydrocarbon group at C–6 usually requires forcing conditions (i.e. excess reagent, higher temperatures and longer reaction time). Thus, by varying the conditions under which the physical embodiment of the second process aspect is carried out, there may be obtained a 10-mono-, 6-mono-, 6,10-di-, or a 6,6,10-trisubstituted 4,5-seco-6-keto-3-yne of my invention.

Since, by my process, the carbon at C–10 undergoes alkylation prior to the carbon at C–6, the 10-alkyl- and 10-alkylene derivatives having up to 12 carbon atoms are conveniently prepared by the alkylation process aspect of my invention by reaction of a 19-nor-4,5-seco of Formula I, i.e. 4,5-seco-3-estryn-17$\beta$-ol-5-one (after protection of the 17-hydroxyl group by preparation of an ester or tetrahydropyranyl ether thereof) with a molar equivalent of an alkyl halide, e.g. propyl iodide, in the presence of an alkylating medium, e.g. sodium hydride in tetrahydrofuran, under mild conditions, e.g. at room temperature for about 16 hours followed by a short period (1.5 hours) at about 60° C., whereby 10–n-propyl-4,5-seco-3-androstyn-17$\beta$-ol-5-one is formed (Example 20).

When starting with a 6- and 10-unsubstituted 4,5-seco-5-keto-3-yne of my invention, e.g. 4,5-seco-3-estryn-17$\beta$-ol-5-one, by using an excess of a hydrocarbon halide, together with heat and longer reaction times, there can be made 6,10-di- and 6,6,10 - tri - substituted compounds. For example, 4,5 - seco - 3 - estryn-17$\beta$-ol-5-one 17-tetrahydropyranyl ether in refluxing tetrahydrofuran in the presence of at least molar equivalents of sodium hydride to which has been added a large molar excess of 2-propenyl bromide will, after 17.5 hours be converted to 6,10-di - (2' - propenyl) - 4,5 - seco-3-androstyn-17$\beta$-ol-5-one 17-tetrahydropyranyl ether (Example 22A), whereas additional halide reagent, i.e. 2 - propenyl bromide, is required plus a longer period of heating time, e.g. 72 hours at reflux temperature, in order to introduce the third 2'-propenyl group to obtain 6,6,10 - tri - (2' - propenyl)-4,5-seco - 3 - androstyn-17$\beta$-ol-5-one 17-tetrahydropyranyl ether (Example 24A).

By combining varying alkylating reagents and techniques, there can be obtained derivatives having different substituents at C–6 and C–10. Thus, 4,5-seco-3-estryn-17$\beta$-ol-5-one (wherein the 17-hydroxy is protected by a 17-tetrahydropyranyl structure) upon treatment with sodium ethoxide in benzene and ethylformate at low temperatures is converted to 6 - formyl - 4,5 - seco - 3 - estryn-17$\beta$-ol which, in turn, upon treatment in benzene with n-butylthiol in the presence of p-toluenesulfonic acid at reflux temperatures for short periods of time (e.g. 1–3 hours) will form the enol-thiol ether derivative of the 6-formyl group to produce 6 - n - butylthiomethylene - 4,5 - seco - 3 - estryn - 17$\beta$ - ol-5-one (Example 25B). Further treatment of the foregoing 4,5-seco-steroid in a strongly basic alkylating medium (e.g. potassium tert.-butoxide in tert. butanol with an execss of dodecyl iodide under forcing conditions, i.e. at reflux temperature for 36 hours) according to the second process aspect of this invention is converted to 6 - n - butylthiomethylene - 10 - dodecyl-3-androstyn-17$\beta$-ol novel steroidal derivatives of my invention.

In the foregoing procedure, the method of 6-formylation followed by enolization at C–6 via butylthiol, provides a means of introducing a novel substituent at C–6 prior to alkylation at C–10 in a 19-nor steroid to produce a 10-higher alkyl analog of the 4,5-seco-5-keto-3-ynes of my invention.

When utilizing methyl iodide as the alkylating hydrocarbon halide reagent, and an excess of reagent is used with respect to the molar quantity of starting steroid, all available hydrogens at C–6 and C–10 will alkylate with ease. Thus, when 4,5 - seco - 3 - estryn-17$\beta$-ol-5-one 17-acetate and the 10-methyl analog thereof (i.e. 4,5-seco-3-androstyn - 17$\beta$ - ol - 5 - one 17-acetate) are each treated with an excess of methyl iodide in an alkylating medium such as butyl lithium in ethylene glycol dimethyl ether at room temperature for only 45 minutes, there is produced the 6,6,10 - trimethyl derivative, i.e. 6,6,10-trimethyl - 4,5 - seco - 3 - estryn-17$\beta$-ol-5-one 17-acetate (identical to 6,6 - dimethyl - 4,5 - seco - 3 - androsyn-17$\beta$-ol-5-one 17-acetate), Examples 15A and 18.

Similarly, 4,5 - seco - 3 - estryn - 17$\beta$ - ol-5-one and the 10-methyl analog thereof when treated in an alkylating medium such as sodium hydride in tetrahydrofuran with an excess of methyl iodide, will, upon stirring at 50 C. for about 15 hours, be converted to the 6,6,10 - trimethyl-17-methylether derivative, e.g. 6,6,10 - trimethyl - 4,5 - seco - 3 - estryn - 17$\beta$ - ol-5-one 17-methyl ether (also named 6,6 - dimethyl - 4,5 - seco - 3 - estryn-17$\beta$-ol-5-one 17-methyl ether) in admixture with some of the methyl ethinyl analog, i.e. 4,6,6 - trimethyl - 4,5 - seco-androstan-17$\beta$-ol-5-one 17-methyl ether (Example 19).

Third process aspect

By means of a third process aspect of my invention, the 5 - hydroxy - 4,5 - seco - 3 - ynes of my invention are derived from the corresponding 5-ones, in turn, prepared as described in the first two process aspects of my invention. The third process aspect of my invention comprises treating a 4,5-seco-5-one, e.g. 4,5 - seco - 3 - androstyn-17β-ol-5-one, and 17α,20;20,21 - bis - methylenedioxy-4,5-seco - 3 - pregnyn-5-one, with a reducing agent which will not effect the alkinyl group at C–3, including alkali metal borohydrides such as lithium borohydride, potassium borohydride and, preferably, sodium borohydride in methanol, and the 5-keto is reduced to a 5-hydroxy function and there is formed respectively, 4,5-seco-3-androstyne-5,17β-diol and 17α,20;20,21 - bis - methylenedioxy - 4,5-seco-3-pregnyn-5-ol.

Any reactive keto substituents present in the molecule are preferably protected prior to reduction with sodium borohydride by preparing functional derivatives thereof, such as dialkyl ketals, cyclic alkylene ketals, enol ethers and enol esters or, when they are present in the C–20 pregnane cortical side chain by preparing acetonide derivatives, e.g. 17α,21-acetonides or 17α,20;20,21-bis-methylenedioxy derivatives.

The 5-hydroxy derivatives of my invention can be esterified utilizing known techniques, e.g. by lower alkanoic acid anhydride in pyridine or a hydrocarbon carboxylic acid halide, e.g. benzoyl cholride or a sulfonic acid chloride in pyridine. Thus 4,5 - seco - 3 - androstyn-5,17β - diol-17-tetrahydropyranyl ether and 17α,20;20,21-bis - methylenedioxy - 4,5 - seco - 3 - pregnyn-5-ol upon treatment with either acetic anhydride or p-toluenesulfonyl chloride will yield the corresponding 5-ester, i.e. the 5-acetate and 5-p-toluenesulfonate, respectively.

In general, when carrying out any of the process aspects it is preferable to introduce into the normal steroid molecule prior to fission and rearrangement by the first process aspect of this invention, any protective groups which will be needed in any of the three process aspects of this invention. When the 4,5 - seco - 5 - keto-3-yne steroidal derivatives thus prepared are to be utilized as intermediates for preparing pharmacologically valuable steroids as discussed hereinabove, the protective groups are conveniently retained until after ring closure of my seco ocmpounds to a normal steroid structure. Alternatively, when the seco compounds are to be used per se, the protective groups, e.g. esters, ethers, acetonides, and bismethylene dioxy functions, can be removed after any one of the processes of this invention.

The above is a description of my invention concept and of physical embodiments thereof exemplifying the manner of making and using my invention. It is to be understood that my invention is not to be construed as limited to the above disclosed but as also encompassing equivalents thereof obvious to one skilled in the art of the class of chemistry to which this invention pertains.

EXAMPLE 1

4,5-seco-3-androstyn-17β-ol-5-one (A) To a solution of 13.8 g. of 4,5-oxido-androstan-17β-ol-3-one in 1350 ml. of ethanol add 9 g. of p-toluenesulfonylhydrazine. Stir the reaction mixture for 2 hours at room temperature then pour into 3 liters of a saturated aqueous sodium chloride solution. Extract the aqueous mixture with three, liter portions of chloroform, then wash the combined chloroform extracts with 3 liters of a 5% sodium bicarbonate solution followed by 3 liters of 2 N hydrochloric acid, and finally with 3 liters of water. Dry the chloroform solution of sodium sulfate, filter and evaporate in vacuo to a residue. Dissolve the residue in benzene and chromatograph on acid-washed alumina. Elute first with benzene followed by ether-benzene(1:4). Evaporate the combined benzene eluates to a residue comprising 4,5 - seco - 3 - androstyn - 17β - ol-5-one (2 g.).

Evaporate the combined ether-benzene eluates to a residue comprising 4,5 - seco - 3 - androstyn - 17β - ol-5-one (9.5 g.).

Purify by sublimation at 110° C. in vacuo ($10^{-2}$ mm. Hg). $[\alpha]_D +29°$ $\lambda_{max}^{Nujol}$ 2.9, 3.0, 4.74, and 5.9μ

NMR 6.4τ (multiplet—C–17H), 8.0τ ($C_{17}$—OH), 8.90τ ($C_{19}$—3H), and 9.2τ ($C_{18}$—3H).

(B) Alternatively the compound of this example is also prepared utilizing methanesulfonylhydrazine as reagent as follows:

To a solution of 200 mg. of 4,5 - oxido-androstan-17β-ol-3-one in 30 ml. of absolute ethanol add 80 mg. of methanesulfonylhydrazine. Stir the reaction mixture at room temperature under nitrogen for 9 hours then evaporate in vacuo to a residue. Chromatograph the residue on 20 g. of alumina, eluting with 5% ether-in-benzene to obtain 4,5 - seco - 3 - androstyn - 17β - ol-5-one (104 mg.) which is identical to the compound produced in above Example 1(A) as determined by thin-layer chromatography (chloroform-ethyl acetate (1:1)-silica gel GF) and by infrared spectral analysis.

EXAMPLE 2

4,5-seco-3-androstyn-17β-ol-5-one (via alternate starting compound)

(A) 4 - androsten - 17β - ol - 3-one 3-p-toluenesulfonylhydrazone.—(1) To 100 mg. (0.35 mmole) of testosterone (4 - androsten - 17β - ol-3-one) in 15 ml. of absolute ethanol add 60 mg. (0.37 mmole) of p-toluenesulfonylhydrazine. Stir the reaction mixture under an atmosphere of nitrogen for 15 hours at room temperature then pour into 75 ml. of ice water. Filter the reaction mixture and wash the residue with about 10 ml. of 1 N hydrochloric acid, two 10 ml. portions of 5% aqueous sodium bicarbonate, and then with 10 ml. of water to obtain 4-androsten - 17β - ol - 3-one 3-p-toluenesulfonylhydrazone (60 mg.). M.P. 124–139° C. dec., frothing (darkens at 130° C.).

$\lambda_{max}^{methanol}$ 259 mμ, ε=17,500

$\lambda_{max}^{Nujol}$ 2.8μ (NH); 3.1μ (OH); 6.15μ (C=C); 6.25μ (NH)

(2) Alternatively, the compound of this example is prepared as follows:

Reflux a mixture of 5 gm. ($1.75 \times 10^{-2}$ moles) of testosterone and 3.55 gm. ($1.91 \times 10^{-2}$ moles) of p-toluenesulfonylhydrazine in 125 ml. of absolute ethanol for 1.5 hours. Cool the reaction mixture and pour into 700 ml. of ice water. Extract the aqueous mixture with a one liter portion and then two 500 ml. portions of methylene chloride. Wash the combined methylene chloride extracts with two 400 ml. portions of 1 N hydrochloric acid, followed by 400 ml. of 5% aqueous sodium bicarbonate, and finally with 400 ml. of saturated sodium chloride solution. Dry the methylene chloride solution over sodium sulfate, then concentrate under reduced pressure to 300 ml. comprising 4 - androsten - 17β - ol-3-one 3-p-toluenesulfonylhydrazone in chloroform. This concentrated solution is used without further purification in following Example 2B.

(B) 4,5-seco-3-androstyn-17β-ol-5-one

To the concentrated methylene chloride solution of 4-androsten - 17β - ol - 3-one 3-p-toluenesulfonylhydrazone (prepared as described in Example 2A-2) add 4.15 g. of 80% m-chloroperbenzoic acid ($1.91 \times 10^{-2}$ moles). Stir the reaction mixture for 17 hours at room temperature under an atmosphere of nitrogen. Wash the solution with two 400 ml. portions of 5% aqueous bisulfite, 400 ml. of 5% aqueous sodium bicarbonate and finally, with 400 ml. of saturated sodium chloride. Dry the methylene chloride solution over anhydrous sodium sulfate and evaporate in vacuo to a residue comprising 4,5-seco-3-androstyn-17β-ol-5-one (5.8 g.).

Purify this residue by chromatography on 150 g. of alumina, eluting with 5% ether in benzene. Evaporate the combined eluates in vacuo to a residue comprising 4,5-seco-3-androstyn-17β-ol-5-one (1.7 g.) which is identical to the compound produced in Example 1A, as determined by thin-layer chromatography and by infrared spectral analyses.

EXAMPLE 3

9,11-seco-22α,25α-11-spirostyn-3β-ol-9-one 3-acetate (A) 9(11)-dehydrohecogenin 3 - acetate 12 - p-toluenesulfonylhydrazone.—Add 10 g. ($2.2 \times 10^{-2}$ moles) of 9(11) - dehydrohecogenin 3 - acetate, 7.5 g. ($4 \times 10^{-2}$ moles) of p-toluenesulfonylhydrazine and 0.75 g. of p-toluenesulfonic acid to 800 ml. of absolute ethanol. Reflux the resulting solution for 60 hours under an atmosphere of nitrogen. Cool the reaction mixture and pour it into 3 liters of ice water. Filter the aqueous mixture and wash the residue with 1 N hydrochloric acid followed by 5% aqueous sodium bicarbonate and finally, with saturated sodium chloride. Dry the washed prepicitate in vacuo to yield 9(11)-dehydrohecogenin 3-acetate 12-p-toluenesulfonylhydrazone.

Purify by recrystallizing twice from methylene chloride-methanol.

M.P. 270–273° C. (dec.)

$\lambda_{max.}^{Nujol}$ 3.05μ, 5.83μ, 6.23μ, 8.15μ, 8.65μ, 12.4μ

(B) 9,11 - seco - 22α,25α - 11 - spirostyn-3β-ol-9-one 3-acetate.—Dissolve 15 g. of 9(11)-dehydrohecogenin 3-acetate 12 - p - toluenesulfonylhydrazone in 1800 ml. of methylene chloride and add 5.6 g. ($2.56 \times 10^{-2}$ moles) of 80% m-chloroperbenzoic acid. Stir the reaction mixture at room temperature for 24 hours under an atmosphere of nitrogen. Wash the methylene chloride solution with 500 ml. of 5% aqueous sodium bisulfite, 500 ml. of 5% aqueous sodium bicarbonate and finally, with 500 ml. of saturated sodium chloride. Dry the methylene chloride solution over anhydrous sodium sulfate then evaporate in vacuo to a residue comprising 9,11-seco-22α,25α-11-spirostyn-3β-ol-9-one 3-acetate.

Purify by chromatography on 450 g. of alumina eluting with 10% ether in benzene. Evaporate the combined eluates to a residue, then crystallize the residue from methanol. M.P. 203.5–207.5° C.

$\lambda_{max.}^{Nujol}$ 3.05μ (C≡CH), 4.65μ (C≡C), 5.75μ (acetate)

EXAMPLE 4

Conversion of 4,5-seco-3-androstyn-17β-ol-5-one to prepare testosterone and testosterone acetate Procedure 1.—To a solution of 288 mg. of 4,5-seco-3-androstyn-17β-ol-5-one in 14 ml. of 90% acetic acid add 75 mg. of mercuric acetate and 0.05 ml. of concentrated sulfuric acid. Heat the reaction mixture at reflux temperature for 1.8 hours under an atmosphere of nitrogen then cool to room temperature and add 50 ml. of water. Extract the reaction mixture with chloroform, then evaporate the combined chloroform extracts to a residue of 295 mg. comprising testosterone (4-androsten-17β-ol-3-one) and testosterone acetate. Separate the mixture by thin layer chromatography on two 8 x 8" x 1 mm. Si-GF plates using a chloroform-ethylacetate solvent system. Identify the components by ultraviolet absorption, then elute from the Si-CF plates with acetone to obtain 167 mg. of testosterone acetate (product 4A) and 20 mg. of testosterone (product 4B). Recrystallize 4A from methylene chloride-ether and 4B from ether to obtain products having a melting point, infrared spectrum and thin layer chromatographic mobility identical to that of authentic samples thereof.

Procedure 2.—To a solution of 1 g. of 4,5-seco-3-androstyn-17β-ol-5-one (compound of Example 1) in 35 ml. of dioxane and 17 ml. of water add 0.1 g. of mercuric oxide and 0.3 ml. of trifluoroacetic acid. Stir the reaction mixture for one hour at room temperature, then add 400 ml. of water and extract with chloroform. Wash the combined chloroform extracts with 2 N hydrochloric acid, 15% aqueous sodium bicarbonate, and finally water. Dry the chloroform solution over sodium sulfate and evaporate in vacuo to 800 mg. of a residue comprising 4,5-seco-androstan-17β-ol-3,5-dione (compound 4C), a homogeneous product as determined by thin layer chromatography (Si-GN with an ether solvent system). Purify by crystallization from ether; M.P. 112–113° C. $[\alpha]_D + 43°$ (CHCl₃), $\lambda_{max.}^{Nujol}$ 2.9 (OH) and 5.85 (C=O)

NMR: 6.2–6.5 ($C_{17}$—H), 7.53 ($C_{17}$—OH), 7.83 ($C_4$—3H); 8.89 ($C_{19}$—3H) and 9.20 τ($C_{18}$—3H).

In a manner similar to that described in Example 6B, treat 4,5-seco-androstan-17β-ol-3,5-dione (compound 4C) with potassium tert.-butoxide in tert.-butanol. Isolate the resultant product in a manner similar to that described to obtain testosterone (Compound 4B).

EXAMPLE 5

6,6-dimethyl-4,5-seco-3-androstyn-17β-ol-5-one 17-methyl ether and 4,6,6 - trimethyl - 4,5 - seco-3-androstyn-17β-ol-5-one 17-methyl ether To a stirred solution of 1.8 g. of sodium hydride in 30 ml. of tetrahydrofuran under a nitrogen atmosphere add dropwise a solution of 2 g. of 4,5-seco-3-androstyn-17β-ol-5-one (compound of Example 1) in 30 ml. of tetrahydrofuran. Heat the reaction mixture for 2 hours at 50° C. then cool to room temperature and add dropwise 12 ml. of methyl iodide. Heat the reaction mixture at 50° C. for 16 hours, cool to room temperature and decompose any excess sodium hydride with water. Add an additional 150 ml. of water then 150 ml. of ether and separate the organic layer from the aqueous layer. Wash the ethereal solution with water then dry over sodium sulfate and evaporate the ether in vacuo to a residue comprising 6,6-dimethyl-4,5-seco-3-androstyn - 17β - ol - 5-one 17-methyl ether (Compound 5A) and 4,6,6-trimethyl-4,5-seco-3-androstyn-17β - ol - 5-one 17- methyl ether (Compound 5B). Purify and separate Compounds 5A and 5B as follows. Dissolve the residue in benzene and chromatograph on Merck acid washed alumina. Elute with benzene-hexane, combine the eluates and evaporate to a residue comprising 4,6,6-trimethyl-4,5-seco-3-androstyn-17β-ol-5-one 17-methyl ether (Compound 5B). Purify by sublimation at 50° C. and 10⁻⁵ mm. Hg, $\lambda_{max.}^{Nujol}$ 3.0, 4.7 and 5.9μ

NMR 6.7 ($C_{17}$—O—$CH_3$), 8.25 (doublet J= 2 c.p.s.) ($C_4$—$CH_3$), 8.94 ($C_{19}$—$CH_3$), 9.03 (2x$C_6$—$CH_3$) and 9.17 τ($C_{18}$—$CH_3$).

Elute with benzene and evaporate the combined eluates to obtain 6,6-dimethyl-4,5-seco-3-androstyn-17β-ol-5-one 17-methyl ether (Compound 5A). Purify by crystallization from ethanol, M.P. 96–98° C.

$\lambda_{max.}^{Nujol}$ 3.0, 4.7 and 5.9μ

NMR 6.7 ($C_{17}$—$OCH_3$), 8.93 and 8.96; ($C_6$—$CH_3$), 8.88 ($C_{19}$—$CH_3$) and 9.18 ($C_{19}$—$CH_3$).

EXAMPLE 6

Conversion of 6,6-dimethyl-4,5-seco-3-androstyn-17β-ol-5-one 17-methyl ether to 6,6-dimethyl testosterone 17-methyl ether (A) 6,6 - dimethyl - 4,5 - seco-androstan-17β-ol-3,5-dione.—To a slurry of 60 mg. red mercuric oxide and 0.1 ml. trifluoroacetic acid add a solution of 500 mg. 6,6-dimethyl-4,5-seco - 3 - androstyn-17β-ol-5-one 17-methyl ether (Compound 5A) in 50 ml. dioxane and 8 ml. water. Stir the reaction mixture for 2 hours at room temperature, then add 200 ml. water and extract with chloroform. Wash the combined chloroform extracts with saturated aqueous sodium bicarbonate solution, 3% hydrochloric acid, and finally with water. Dry the solution over sodium sulfate and evaporate in vacuo to a residue of 496 mg. comprising 6,6-dimethyl-4,5-seco-androstan-17β-ol-3,5-dione 17-methyl ether (Compound 6A), together with an impurity which appears at the origin on a thin layer plate (Si-GF benzene-ether solvent system). Purify by chromatography on a short silica gel column eluting with benzene-ether (1:1). Distill the combined eluates to give 6,6-dimethyl-4,5-seco-androstan-17β-ol-3,5-dione (256 mg.).

To obtain an analytical sample, purify further by repeated crystallization from methylene chloride-methanol, M.P. 161–163° C.; $[\alpha]_D^{24}$ —14.1° (CHCl$_3$),

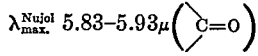

NMR: 6.67 (OCH$_3$), 7.97

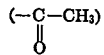

8.85 (C$_{19}$—CH$_3$), 8.90 (C$_6$—CH$_3$), 8.96 (C$_6$—CH$_3$) and 9.17 τ(C$_{18}$—CH$_3$).

(B) 6,6-dimethyl-testosterone 17-methyl ether (6,6 - dimethyl - 4 - androsten-17β-ol-3-one 17-methyl ether).—To a solution of 227 mg. 6,6-dimethyl-4,5-seco-androstan-17β-ol-3,5-dione 17-methyl ether (Compound 6A) in 15 ml. dry t-butanol, add 75 mg. potassium tertiary butoxide. Heat the reaction mixture at reflux temperature for 3 hours, then pour into 100 ml. water. Acidify the aqueous solution with 3% hydrochloric acid, extract with chloroform, and wash the combined chloroform extracts with water. Dry the solution over sodium sulfate and evaporate in vacuo to a residue (175 mg.) comprising 6,6-dimethyl-testosterone 17-methyl ether (Compound 6B).

Purify by sublimation at 110° C. and 10$^{-5}$ mm.; M.P. 92–96° C.

$\lambda_{max.}^{Nujol}$ 6.0 (—C=O), 6.24μ (—C=C—)
NMR: 4.07 (C$_4$—H); 6.67 (OCH$_3$), 6.6–6.9 (C$_{17}$—H), 8.70 (C$_{19}$—CH$_3$), (C$_{19}$—CH$_3$), 8.82 and 8.86 (2 x C$_6$—CH$_3$) and 9.17 τ(C$_{18}$—CH$_3$).

EXAMPLE 7

4,5-seco-3-androstyne-5β,17β-diol

To a solution of 0.6 g. 4,5-seco-3-androstyne-17β-ol-5-one in 80 ml. of methanol add 1.2 g. sodium borohydride. Stir the reaction mixture for one hour at room temperature then add an additional 1.2 g. of sodium borohydride and stir for an additional 16 hours at room temperature. Pour the reaction mixture into 200 ml. of ice water and extract two times with 150 ml. portions of chloroform. Wash the combined extracts with water, dry over sodium sulfate and evaporate in vacuo to a residue (430 mg.) comprising 4,5-seco-3-androstyne-5β,17β-diol. Purify by crystallization from methylene chloride-ether and recrystallize from ether-hexane; M.P. 120–125° C., $[\alpha]_D^{25}$ 9° (CHCl$_3$), $\lambda_{max.}^{Nujol}$ 3.0 (C≡C—H and OH) 4.68μ (C≡C)
NMR: 9.17 (C$_{19}$—3H) and 9.28τ (C$_{18}$—3H).

EXAMPLE 8

6,6-di-(2'-propenyl)-4,5-seco-3-androstyn-17β-ol-5-one (A) 4,5 - seco - 3 - androstyn - 17β - ol - 5-one 17-tetrahydropyranyl ether.—To a solution of 10 g. of 4,5-seco-3-androstyn-17β-ol-5-one in 30 ml. of dry benzene add 10 mg. of p-toluenesulfonic acid and 0.6 ml. of dihydropyran. Stir the reaction mixture for 2 hours at room temperature, then add water and separate the organic solution from the aqueous phase. Wash the organic solution with water then dry over sodium sulfate and evaporate the benzene and excess dihydropyran in vacuo to a residue comprising 4,5-seco-3-androstyn-17β-ol-5-one 17-tetrahydropyranyl ether.

$\lambda_{max.}^{film}$ 3.0 and 4.7 (C≡CH) and 5.85μ (C=O)

Purify by chromatography on silica gel eluting with benzene. Distill the benzene from the combined eluates to a residue comprising 4,5-seco-3-androstyn-17β-ol-5-one 17-tetrahydropyranyl ether, This compound is used without further purification in the procedure of Example 8B.

(B) 6,6 - di - (2' - propenyl) - 4,5 - seco-androstyn-17β - ol - 5 - one 17-tetrahydropyranyl ether.—To a slurry of 3.2 g. of a 50% suspension of sodium hydride in mineral oil and 55 ml. of tetrahydrofuran, add dropwise a solution of 3.7 g. 4,5-seco-3-androstyn-17β-ol-5-one 17-tetrahydropyranyl ether in 55 ml. of tetrahydrofuran. Heat the reaction mixture at reflux temperature for 2 hours under an atmosphere of nitrogen then cool to room temperature. Over a period of 20 minutes add dropwise a solution of 5.2 g. 1,3-dibromopropane in 55 ml. of tetrahydrofuran. Heat the reaction mixture at reflux temperature for 18 hours, cool to room temperature, decompose any excess sodium hydride with water, then add 400 ml. of ether. Wash the ether solution with water and dry over sodium sulfate and remove the solvent in vacuo to a residue comprising 6,6 - di - (2'-propenyl)-4,5-seco-3-androstyn - 17β - ol - 5 - one 17-tetrahydropyranyl ether. Purify by dissolving in benzene and chromatographing on 150 g. of Merck acid washed aluminum eluting with benzene-hexane. Distill the combined eluates to a residue comprising 6,6 - di - (2' - propenyl) - 4,5-seco-3-androstyn-17β - ol - 5 - one 17 - tetrahydropyranyl ether (yield =2.6 g.).

Prepare an analytical sample by sublimation at 10$^{-4}$ mm. and 80° C.

$\lambda_{max.}^{film}$ 3.0 and 4.7 (C≡C—H), 3.25, 6.1, and 10.9

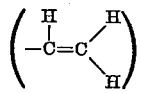

and 5.9μ (C=O). NMR 4.9

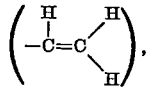

8.95 (C$_{19}$—3H), and 9.16τ (C$_{18}$—3H)

(C) 6,6 - di - (2' - propenyl) - 4,5 - seco - 3 - androstyn - 17β - ol - 5 - one.—To a solution of 0.26 g. of 6,6 - di - (2' - propenyl) - 4,5 - seco - 3 - androstyn-17β-ol-5-one in 12 ml. of methanol, add 1.3 ml. of water followed by 0.5 ml. 12N hydrochloric acid. Stir the reaction mixture for 2 hours at room temperature, add 25 ml. of water and extract the solution with chloroform. Remove the chloroform from the combined extracts in vacuo to give 250 mg. of a residue comprising 6,6-di-(2'-propenyl) - 4,5 - seco - androstyn-17β-ol-5-one. Purify by sublimation at 10$^{-4}$ mm. Hg and 80° C.

$\lambda_{max.}^{Nujol}$ 2.9 (—OH) 3.0
and 4.7 (C≡CH), 3.25, 6.1, and 10.9

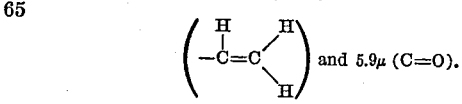

EXAMPLE 9

Conversion of 6,6-di-(2'-propenyl)-4,5-seco-3-androstyn-17β-ol-5-one to 6,6-di-(2'-propenyl)-testosterone (A) 6,6 - di - (2' - propenyl) - 4,5 - seco-17β-ol-3,5-dione.—To a suspension of 0.1 g. red mercuric oxide in 30 ml. of 20% aqueous dioxane containing 0.1 ml. of trifluoroacetic acid, add dropwise a solution of 1.0 g. 6,6-di - (2' - propenyl) - 4,5 - seco - 3 - androstyn-17β-ol-5-one 17-tetrahydropyranyl ether in 30 ml. of 33% aqueous dioxane. Stir the reaction mixture for about 15 minutes and when the solution becomes cloudy add an additional 5 ml. of dioxane. Stir the reaction mixture at room temperature for an additional 20 hours, then add 2 ml. of 12 N hydrochloric acid and continue stirring for an additional 2 hours. Add the reaction mixture to 400 ml. of a saturated sodium chloride solution and extract four times with 100 ml. portions of chloroform. Wash the combined chloroform extracts with water and dry over sodium sulfate and evaporate in vacuo to a residue (790 mg.) comprising 6,6-di-(2'-propenyl)-4,5-seco-androstan-17β-ol-3,5-dione. Purify by dissolving in benzene and chromatographing on 25 g. of silica gel-G eluting with ether. Distill the eluates comprising 6,6-di-(2'-propenyl)-4,5-seco-17β-ol-3,5-dione (purified yield=600 mg.).

Prepare an analytical sample by sublimation at $10^{-4}$ mm. at 80°: $[\alpha]_D$ —3;

$\lambda_{max.}^{Nujol}$ 2.8 (—OH), 3.0 and 4.7 (C≡C—H) 3.25, 6.1 and 10.9 and 5.9μ (2 x—C=O).

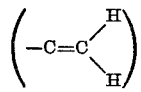

(B) 6,6-di-(2'-propenyl) - 4 - androsten-17β-ol-3-one (6,6-di-(2'-propenyl)-testosterone). To a solution of 150 mg. of 6,6-di(2'-propenyl)-4,5-seco-androstan-17β-ol-3,5-dione in 15 ml. of t-butanol, add 50 mg. of potassium tertiary butoxide. Stir the reaction mixture at room temperature for 1.5 hours, at reflux temperature for 6 hours, at 40° C. for an additional 17 hours then cool to room temperature. Add the reaction mixture to 50 ml. of water, neutralize with 2 N hydrochloric acid and extract three times with 25 ml. portions of chloroform. Wash the combined chloroform extracts with water, dry over sodium sulfate and distill the chloroform in vacuo to a residue (129 mg.) comprising 6,6-di-2'-propenyl)-4-androsten-17β-ol-3-one (6,6-di-(2'-propenyl)-testosterone). Purify by repeated crystallization from acetone; M.P. 196-198° C.; $[\alpha]_D$ +55 (CHCl₃), $\lambda_{max.}^{Nujol}$ 2.85 (—OH), 6.0 (C=O), 6.1 (C=C)

and 6.23 and 10.9μ

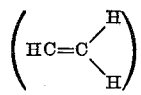

NMR 4.27 (4H); 4.83

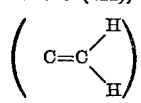

5.1 (HC=C), 8.68 ($C_{19}$—3H) and 9.18 ($C_8$—3H).

EXAMPLE 10

6,6-pentamethylene-4,5-seco-3-androstyn-17β-ol-5-one (A) 6,6-pentamethylene-4,5-seco - 3-androstyn-17β-ol-5-one 17-tetrahydropyranyl ether.—To a stirred slurry of 0.43 g. of sodium hydride in 30 ml. of dry tetrahydrofuran under an atmosphere of nitrogen, add dropwise over a period of 10 minutes a solution of 2.2 g. of 4,5-seco-3-androstyn-17β-ol-5-one 17-tetrahydropyranyl ether in tetrahydrofuran. Heat the reaction mixture at reflux temperature for two hours, then cool to room temperature and add dropwise over a period of ten minutes a solution of 1.38 g. of 1,5-dibromopentane in tetrahydrofuran. Heat the reaction mixture for 16 hours at 70° C., cool to room temperature, then decompose the excess sodium hydride by the dropwise addition of water, then add 100 ml. of water followed by 100 ml. of ether. Wash the etheral solution with water, dry over sodium sulfate, then remove the solvents in vacuo. Dissolve the resultant residue in benzene and chromatograph on 70 grams of Merck acid washed alumina eluting with hexane-benzene. Evaporate the eluates to a residue comprising 6,6-pentamethylene-4,5-seco-3-androstyn-17β-ol-5-one 17-tetrahydropyranyl ether (yield=0.6 g.);

$\lambda_{max.}^{film}$ 3.0 (C≡C—H), 4.7 (C≡C) and 5.9μ (C=O)

$\lambda_{max.}^{MeOH}$ 245 mμ (ε8700)

This compound is used without further purification in the procedure of Example 10B immediately following.

(B) 6,6-pentamethylene-4,5-seco-3-androstyn-17β-ol-5-one.—To a solution of 0.4 g. of 6,6-pentamethylene-4,5-seco-androstyn - 17β-ol-5-one 17-tetrahydropyranyl ether in 20 ml. of 10% aqueous methanol add dropwise 0.5 ml. of 12 N hydrochloric acid. Stir the reaction mixture for three hours at room temperature, then add 10 ml. of water and 10 ml. of chloroform. Extract the aqueous phase two additional times with 10 ml. portions of chloroform. Dry the combined chloroform extracts over sodium sulfate, then evaporate in vacuo. Dissolve the resulting residue in benzene and chromatograph on 12 g. of silica gel-6 eluting with a solution of 5% ether in benzene. Evaporate the eluates to a residue comprising 6,6-pentamethylene-4,5 - seco-3-androstyn-17β-ol-5-one (yield=0.260 g.). Prepare an analytical sample by sublimation at $10^{-4}$ mm. at 80° C.;

$\lambda_{max.}^{film}$ 2.9 (—OH), 3.0 and 4.7 (C≡C—H);

and 5.9μ (C=O)

EXAMPLE 11

6,6-pentamethylene-testosterone (6,6-pentamethylene-4-androsten-17β-ol-3-one)

Conversion of 6,6-pentamethylene-4,5-seco-3-androstyn-17β-ol-5-one to 6,6-pentamethylene-testosterone (A) 6,6-pentamethylene-4,5 - seco-androstan-17β-ol-3,5-dione.—To a slurry of 0.11 g. of red mercuric oxide in 20 ml. of dioxane containing 0.1 ml. trifluoroacetic acid, add dropwise a solution of 0.625 g. of 6,6-pentamethylene - 4,5 - seco-3-androstyn-17β-ol-5-one in 15 ml. of 33% aqueous dioxane. Stir the reaction mixture for 5 hours at room temperature under an atmosphere of nitrogen, then pour into 200 ml. of water and extract several times with 100 ml. portions of chloroform. Wash the combined chloroform extracts with a 5% aqueous sodium bicarbonate solution followed by a 2 N hydrochloric acid solution, and finally with water. Dry the chloroform solution over sodium sulfate, then remove the chloroform in vacuo to a residue (0.600 g.) comprising 6,6-pentamethylene-4,5-seco-androstan-17β-ol-3,5-dione. Purify by crystallization from acetone. Prepare an analytical sample by recrystallization from acetone; M.P. 112-113° C. $[\alpha]_D$ 7 (CHCl₃), $\lambda_{max.}^{Nujol}$ 2.8 (—OH) and 5.85μ (C=O)

NMR: 7.88 ($C_4$-3H); 8.92 ($C_{19}$-3H3; 9.2τ ($C_{18}$-3H).

(B) 6,6-pentamethylene-testosterone.—To a stirred solution of 0.300 g. of 6,6-pentamethylene-4,5-seco-androstan-17β-ol-3,5-dione in 30 ml. of t-butyl alcohol add 0.1 g. of potassium tertiary butoxide. Heat the reaction mixture at reflux temperature for 6 hours under an atmosphere of nitrogen and stir for an additional 16 hours at room temperature. Pour the reaction into 100 ml. of water and neutralize the resulting solution with 2 N hydrochloric acid, then extract with three 75 ml. portions of chloroform. Wash the combined chloroform extracts with water, dry over sodium sulfate, then remove the chloroform in vacuo. Crystallize the resultant residue (0.277 g.) from acetone to give 6,6-pentamethylene-testosterone. Prepare on analytical sample by recrystallization from acetone; M.P. 181–183° C.; $[\alpha]_D$ 121° (CHCl)$_3$;

$\lambda_{max.}^{Nujol}$ 2.8 (—OH), 6.0 (C=O), and 6.23μ (C=C);

$\lambda_{max.}^{EtOH}$ 245 mμ

(ϵ 14,400); NMR: 4.0 (C$_4$—H); 8.72 (C$_{19}$—3H); and 9.18τ (C$_{19}$—3H).

EXAMPLE 12

4,5-seco-3-androstyne-5,17-dione and conversion thereof to 4-androstene-3,17-dione (A) 4,5-seco-3-androstyne-5,17 - dione.—To a stirred solution of 0.38 g. of 4,5-seco-3-androstyn-17β-ol-5-one in 20 ml. of acetone, add chromium trioxide until a permanent yellow color appears. Add the reaction mixture to 75 ml. of ice and saturated sodium chloride solution, then extract with three 50 ml. portions of ether. Wash the combined ether extracts with water, dry over sodium sulfate and distill in vacuo to a residue (0.33 g.) comprising 4,5-seco-3-androstyne-5,17 - dione. Purify by crystallization from ether. Prepare an analytical sample by recrystallization from ether; M.P. 116–118° C. $[\alpha]_D$ 99 (CHCl$_3$);

$\lambda_{max.}^{Nujol}$ 3.0 (C≡CH), 4.7 (C≡C), 5.8 (C=O),

NMR: 8.9 (C$_{10}$—3H) and 5.9μ (C=O)

(B) 4-androstene-3,17-dione.—In a manner similar to that described in Example 4 (Procedure 1), treat 4,5-seco-3-androstyne-5,17-dione in acetic acid with mercuric acetate and concentrated sulfuric aid to obtain 4-androstene-3,17-dione.

(C) 4,5-seco-3-estryne-5,17-dione and conversion thereof to 4-estrene-3,17-dione.—In a manner similar to that described in Example 12A above, treat 4,5-seco-3-estryn-17β-ol-5-one (the compound of Example 16) in acetone with chromium trioxide and isolate and purify the resultant product to obtain 4,5-seco-3-estryne-5,17 - dione (compound 12C) which in turn, upon treatment with mercuric acetate and concentrated sulfuric acid in acetic acid according to the procedure described in the above Example 12B is converted to 4-estrene-3,17-dione.

EXAMPLE 13

6,6-dimethyl-4,5-seco-3-androstyn-17β-ol-5-one 17-acetate (A) 4,5-seco-5-dehydro-3-androstyne-5,17β-diol diacetate.—To a solution of 1.0 g. 4,5-seco-3-androstyn-17β-ol-5-one (compound of Example 1) in 12 ml. of carbon tetrachloride, add 3 ml. of acetic anhydride and two drops of 70% perchloric acid. Allow the solution to stand at room temperature for 1.5 hours, then dilute with ether to a volume of 150 ml. Wash the ether solution with saturated aqueous sodium bicarbonate, then water and dry over sodium sulfate. Distill the solution in vacuo to a residue (1.18 g.) comprising 4,5-seco-5-dehydro - 3 - androstyne-5,17β-diol diacetate.

$\lambda_{max.}^{film}$ 3.0 (≡C—H)

NMR: 5.4 (C$_{17}$—H), 7.98 (2 x acetate), 8192 (C$_{19}$—3H) and 9.13τ (C$_{18}$—3H) 4.72 (C≡C); 5.72 (enol acetate), 5.88μ (acetate).

This product is used without further purification in the following Example 13B.

(B) 6,6-dimethyl-4,5-seco-3-androstyn-17β-ol - 5 - one 17-acetate.—Into a dry nitrogen filled flask inject a solution of 12 ml. 1.6 M n-butyl lithium in hexane. Evaporate the solvent in vacuo and to the residue add 5 ml. of dry ethylene glycol dimethyl ether in small portions, then add in 2 ml. portions a solution of 375 mg. of 4,5-seco-5-dehydro-3-androstyne-5,17β-diol diacetate in 10 ml. dry ethylene glycol dimethyl ether. Stir the reaction mixture at room temperature for 30 minutes then add 2 ml. of methyl iodide and stir the reaction mixture another 20 minutes. Stop the reaction by adding 3% hydrochloric acid to the solution, then dilute the two layers with ether and water. Wash the ether extract with aqueous sodium bicarbonate, then with water. Dry over sodium sulfate and evaporate in vacuo to a residue (376 mg.) comprising 6,6-dimethyl-4,5-seco-3-androstyn-17β-ol-5-one 17-acetate in admixture with a trace of 6,6-dimethyl-4,5-seco-3-androstyn-17β-ol-5-one 17-methyl ether as detected by nmr and some starting material. Separate the starting material from the product mixture by chromatography on two 8 x 8-inch 1-mm. thick Si-GF plates (solvent system: benzene-ether (1:1)).

$\lambda_{max.}^{film}$ 3.0 (≡C—H)

4.72 (C≡C); 5.78

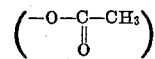

5.9μ (—C=O). NMR: 5.4 (multiplet C$_{17}$—H); 7.96

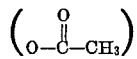

8.85 (C$_6$—CH$_3$); 8.92 (C$_{19}$—CH$_3$); 8.96 (C$_6$—CH$_3$); 9.13τ (C$_{18}$—CH$_3$)

This product was used without further purification in the procedure of Example 14A.

EXAMPLE 14

Conversion of 6,6-dimethyl-4,5-seco-3-androstyn-17β-ol-5-one 17-acetate to 6,6-dimethyl:testosterone (A) 6,6-dimethyl-4,5-seco-androstan-17β - ol - 3,5-dione 17-acetate.—To a solution of 133 mg. of 6,6-dimethyl-4,5-seco-3-androstyn-17β-ol-5-one 17-acetate containing a trace of 6,6-dimethyl-4,5-seco-3-androstyn - 17β-ol-5-one 17-methyl ether (the product of Example 13B) in 7 ml. of glacial acetic acid, add 40 mg. of mercuric acetate and 0.02 ml. of concentrated sulfuric acid. Heat the reaction mixture to 115° C. and stir at 115° C. for 20 minutes, then stir for another 40 minutes at room temperature. Pour the reaction mixture into water and extract the resulant precipiate with ether. Wash the combined ether extracts with aqueous sodium bicarbonate, 3% hydrochloric acid, then water. Dry over sodium sulfate and distill the ether in vacuo to a residue (129 mg.) comprising 6,6-dimethyl-4,5-seco-androstan-17β-ol-3,5-dione 17-acetate containing a trace of 6,6-dimethyl-4,5-seco-androstan-17β-ol-3,5 - dione 17-methyl ether as detected by NMR.

$\lambda_{max.}^{film}$ 5.76

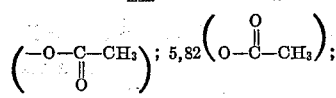

5.9μ (C=O). NMR 5.4 (C$_{17}$—H),

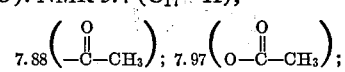

8.87 (C$_6$—CH$_3$); 8.92 (C$_{19}$—CH$_3$); 8.96 (C$_6$—CH$_3$); 9.13τ (C$_{18}$—CH$_3$)

This product was used without further purification in procedure 14B immediately following.

(B) 6,6 - dimethyl - 4,5 - seco-androstan-17β-ol-3,5-dione.—To a solution of 129 mg. of 6,6-dimethyl-4,5-seco-androstan-17β-ol-3,5-dione 17-acetate containing a trace of 6,6-dimethyl-4,5-seco-androstan - 17β - ol-3,5-dione 17-methyl ether (the product of Example 14A) in 15 ml. of dioxane, add 2 ml. of 25% aqueous potassium hydroxide solution. Stir the reaction mixture at 110° C. for 6 hours, then cool to room temperature and stir an additional 70 hours. Pour the solution into ice water, acidify with 3% hydrochloric acid and extract with chloroform. Wash the combined chloroform extracts with aqueous sodium bicarbonate solution, 3% hydrochloric acid, then water. Dry the chloroform solution over sodium sulfate, then remove the chloroform in vacuo to a residue (128 mg.). Chromatograph the residue on an 8 x 8-inch 1-mm. thick Si-GF plate utilizing benzene-ether as the solvent system. Elute the product comprising 6,6-dimethyl-4,5-seco-androstan-17β-ol-3,5-dione in admixture with a trace of 6,6-dimethyl-testosterone from the Si-GF with chloroform. Yield=42 mg.

$\lambda_{max.}^{film}$ 2.9 (OH); 5.8–5.95

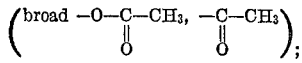

6.0μ (C=O), NMR 4.15–4.50 (multiplet $C_{17}$—H);

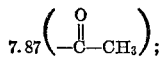

8.84 ($C_6$—$CH_3$); 8.89 ($C_{19}CH_3$); 8.96 ($C_6$—$CH_3$); 9.17τ ($C_{18}$—$CH_3$).

This product was used in the following procedure 14C without further purification.

(C) 6,6-dimethyl-testosterone (6,6-dimethyl-4-androsten-17β-ol-3-one).—To a solution of 40 mg. of 6,6-dimethyl-4,5-seco-androstan-17β-ol-3,5-dione in admixture with a small quantity of 6,6-dimethyl-testosterone (product of Example 14B) in 12 ml. of dry t-butanol add 50 mg. of potassium t-butoxide. Stir the mixture at 50° C. for 16 hours, then pour into 100 ml. of water, acidify the aqueous solution with 3% hydrochloric acid and extract with chloroform. Wash the combined chloroform extracts with water, dry over sodium sulfate and distill the chloroform in vacuo to a residue (39 mg.) comprising 6,6-dimethyl-testosterone. Purify by chromatography on an 8 x 8-inch 1-mm. thick Si-GF plate utilizing benzene-ether (1:1) as the solvent system. Elute the 6,6-dimethyl-testosterone from Si-GF with acetone (yield=25 mg.). Prepare an analytical sample by sublimation at 108° and 2 x 10$^{-5}$ mm.; M.P. 150–156° C. [α]$_{365}$=750.2°. The infrared and NMR data for 6,6-dimethyl-testosterone are in agreement with data recorded in the literature (T.d.y. D'Silva and Howard T. Ringold. Tetrahedron Letters, No. 50, p. 4490 (1965)).

EXAMPLE 15

Conversion of 4,5-seco-3-androstyn-17β-ol-5-one 17-acetate to 6,6-dimethyl-testosterone (A) 6,6 - dimethyl - 4,5 - seco-3-androstyn-17β-ol-5-one 17-acetate.—Inject 25 ml. of 1.6 M n-butyl lithium in hexane into a dry nitrogen filled flask. Evaporate the hexane in vacuo and to the resultant semi-solid residue add in small portions 15 ml. of dry ethylene glycol dimethyl ether. Then add to this mixture in 3 ml. portions 500 mg. of 4,5-seco-3-androstyn-17β-ol-5-one 17-acetate (prepared by the action of 4,5-seco-3-androstyn-17β-ol-5-one in pyridine with acetic anhydride in a manner similar to the procedure of Example 18A) in 18 ml. of ethylene glycol dimethyl ether. Stir the solution at room temperature for 1.5 hours, then add 5 ml. methyl iodide and continue stirring for another 45 minutes. Add 20 ml. of 3% hydrochloric acid, then dilute the reaction mixture with ether and water to a total of 100 ml. Wash the ether extracts with aqueous sodium bicarbonate, then water and dry over sodium sulfate. Distill the solvents in vacuo to a residue (610 mg.) comprising 6,6-dimethyl-4,5-seco-3-androstyn-17β-ol-5-one 17-acetate in admixture with a small quantity of 6,6-dimethyl-4,5-seco-3-androstyn-17β-ol-5-one 17-methyl ether. This product is identical to the product obtained in Example 13B as determined by thin layer chromatographic analysis, infrared and NMR spectral data. The product of this example is used without further purification in the following procedure Example 15B.

(B) Alternate procedure of converting 6,6-dimethyl-4,5 - seco-3-androstyn-17β-ol-5-one 17-acetate to 6,6-dimethyl-4,5-seco-androstan - 17β - ol-3,5-dione 17acetate.— To a slurry of 60 mg. red mercuric oxide in 10 ml. dioxane add 0.1 ml. trifluoroacetic acid followed by a solution of 600 mg. 6,6 - dimethyl-4,5-seco-3-androstyn-17β-ol-5-one 17-acetate mixed with the corresponding 17-methyl ether (i.e. the product of Example 15A) in 15 ml. of dioxane and 5 ml. of water. Stir the reaction mixture for 5.5 hours at room temperature, then pour into 200 ml. cold water, extract the resultant white suspension with three 50 ml. portions of chloroform. Wash the combined chloroform extracts with water, dry over sodium sulfate and evaporate in vacuo to a residue (537 mg.) comprising 6,6-dimethyl - 4,5 - seco-androstan-17β-ol-3,5-dione 17-acetate in admixture with a small quantity of 6,6-dimethyl-4,5-seco-androstan-17β-ol-3,5 - dione 17-methyl ether. This product is identical to the product of Example 14A as determined by thin layer chromatographic data and spectroscopic data.

(C) 6,6-dimethyl-testosterone (6,6-dimethyl-4-androsten-17β-ol-3-one).—Treat 6,6 - dimethyl-4,5-seco-androstan-17β-ol-3,5-dione 17-acetate with potassium tertiary butoxide in t-butanol in a manner similar to that described in Example 9B to obtain 6,6-dimethyl-testosterone in admixture with a small quantity of the corresponding methyl ether, i.e. 6,6-dimethyl-testosterone methyl ether.

EXAMPLE 16

4,5-seco-3-estryn-17β-ol-5-one

To a solution of 8.0 g. of 4,5-oxido-estran-17β-ol-3-one in 250 ml. of methanol add 5.15 g. of p-toluenesulfonylhydrazine. Stir the resulting mixture at 50° C. for 5 minutes, then at room temperature for an additional 10 minutes. Pour the resulting yellow solution onto an ice-water sodium chloride solution and extract the resulting precipitate with chloroform. Wash the combined chloroform extracts with aqueous sodium bicarbonate followed by dilute hydrochloric acid, then water and dry over sodium sulfate and concentrate to a residue comprising 4,5-seco-3-estryn-17β-ol-5-one.

Purify by chromatography on 250 g. of Florisil followed by elution with ether (5.2 g.). Upon further purification by crystallization from ether-hexane there is obtained an analytical sample of 4,5-seco-3-estryn-17β-ol-5-one.

M.P. 89–90° C. α/D=1 (chloroform).

$\lambda_{max.}^{Nujol}$ 3.0 (3340) (OH); 3.05 (3280) (C≡C—H); 4.72 (2120) (C≡C); 5.85μ (17 cm.$^{-1}$) (C=O)

NMR 6.4τ (C–17–H); 9.17τ (C–18-$CH_3$)

EXAMPLE 17

Conversion of 4,5-seco-3-estryn-17β-ol-5-one to 19-nor-testosterone 17-acetate

To a solution of 160 mg. of 4,5-seco-3-androstyn-17β-ol-5-one in 8 ml. of 90% acetic acid, add 42 mg. mercuric acetate and 0.03 ml. of concentrated sulfuric acid. Stir the resulting mixture under nitrogen at 100° C. for 90 minutes then pour into cold water. Extract the aqueous mixture with other, wash the combined ethereal extracts with aqueous sodium bicarbonate then dilute hydrochloric acid and finally with water. Dry over sodium sulfate and evaporate in vacuo to obtain a residue comprising 19-nor-testosterone 17-acetate. Thin layer chromatographic data and spectroscopic data of the product of this example is similar to that of an authentic sample of 19-nor-testosterone 17-acetate.

$\lambda_{max.}^{Nujol}$: 5.76 (1735) (OAc); 5.98 (1670) (C=O); 6.13μ (1630 cm.$^{-1}$) (—C=C—)

EXAMPLE 18

Conversion of 4,5-seco-3-estryn-17β-ol-5-one to 6,6-dimethyl-4,5-seco-3-androstyn-17β-ol-5-one 17-acetate (A) 4,5-seco-3-estryn-17β-ol-5-one 17-acetate.—To a solution of 1.0 g. of 4,5-seco-3-estryn-17β-ol-5-one (compound of Example 16) in 10 ml. of pyridine, add 1 ml. of acetic anhydride and leave at room temperature for 16 hours. Evaporate in vacuo to a small volume, then dissolve the residue in 100 ml. of ether. Wash the ether solution with water, dry over sodium sulfate and remove the ether in vacuo to a residue (1.1 g.) comprising 4,5-seco-3-estryn-17β-ol-5-one 17-acetate.

$\lambda_{max.}^{Nujol}$ 3.05 (C≡C—H),

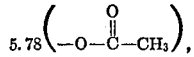

5.90 (—C=O). NMR 5.2–5.6 (C₁₇–H);

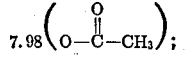

9.11 τ (C₁₉–CH₃).

(B) In a manner similar to that described in Example 15A, treat 4,5-seco-3-estryn-17β-ol-5-one 17-acetate with n-butyl lithium in ethylene glycol dimethyl ether followed by an excess of methyl iodide to obtain 6,6-dimethyl-4,5-seco-3-androstyn-17β-ol-5-one 17-acetate, which is identical to the compound obtained in Example 15A as determined by chromatographic and spectroscopic data.

EXAMPLE 19

Conversion of 4,5-seco-3-estryn-17β-ol-5-one to 6,6-dimethyl-4,5-seco-3-androstyn-17β-ol-5-one 17-methyl ether In a manner similar to that described in Example 5 treat 4,5-seco-3-estryn-17β-ol-5-one (compound of Example 16) with sodium hydride in tetrahydrofuran followed by an excess of methyl iodide to obtain 6,6-dimethyl-4,5-seco-3-androstyn-17β-ol-5-one 17-methyl ether.

EXAMPLE 20

10β-n-propyl-4,5-seco-3-estryn-17β-ol-5-one (A) 4,5-seco-3-estryn-17β-ol-5-one 17-tetrahydropyranyl ether.—To a solution of 50 mg. of p-toluenesulfonic acid in 100 ml. dry benzene add a solution of 2.1 g. 4,5-seco-3-estryn-17β-ol-5-one (compound of Example 16) in 100 ml. dry benzene. To this mixture add 1 ml. dihydropyran in one portion. Stir the reaction mixture for one hour at room temperature then wash with water and dry over sodium sulfate. Evaporate the benzene in vacuo to a residue (2.6 g.) comprising 4,5-seco-3-estryn-17β-ol-5-one 17-tetrahydropyranyl ether (i.e.

$\lambda_{max.}^{film}$ 3.04 (≡C—H), 4.70 (C≡C—), 5.85 μ (C=O)

NMR 5.25–5.50, 5.85–6.75 (OTHP and C₁₇–H), 9.13 and 9.15 τ (C₁₈–CH₃).

(B) 10β - n-propyl - 4,5-seco-3-estryn-17β-ol-5-one 17-tetrahydropyranyl ether.—To a slurry of 3 g. of 62.4% sodium hydride (in mineral oil) in 30 ml. dry tetrahydrofuran add in one portion a solution of 1.54 g. 4,5-seco-3-estryn-17β-ol-5-one 17-tetrahydropyranyl ether in 45 ml. dry tetrahydrofuran. Stir the reaction mixture at room temperature under a nitrogen atmosphere for 1.5 hours, then add 0.42 ml. n-propyl iodide. Stir the reaction mixture at room temperature for 16 hours, then heat at reflux temperature for 1.5 hours. Decompose the excess sodium hydride by adding 25 ml. of water, then dilute the reaction mixture with 150 ml. of ether, separate the layers and wash the organic layer with water. Dry the organic solution over sodium sulfate, then remove the solvent in vacuo, chromatograph the resultant residue on 200 g. of Florisil eluting with 5% ether. Evaporate the ether from the combined eluates to a residue (471 mg.) comprising 10β - n-propyl-4,5-seco-3-estryn-17β-ol-5-one 17-tetrahydropyranyl ether.

$\lambda_{max.}^{film}$ 3.0 (≡C—H); 4.7 (C≡C); 5.85μ (C=O)

This product was used without further purification in the following procedure of Example 20C.

(C) 10β - n-propyl-4,5-seco-3-estryn-17β-ol-5-one.—To a solution of 470 mg. 10β-n-propyl-4,5-seco-3-estryn-17β-ol-5-one 17-tetrahydropyranyl ether in 40 ml. 90% aqueous methanol, add 2 ml. concentrated hydrochloric acid and stir the mixture at room temperature for 1.5 hours. Pour the reaction mixture into cold water (25° C.) and extract the resulting white suspension into chloroform. Wash the combined chloroform extracts with aqueous sodium bicarbonate, then water and dry over sodium sulfate. Evaporate the solvent in vacuo to a residue (270 mg.) comprising 10β-n-propyl-4,5-seco-3-estryn-17β-ol-5-one $\lambda_{max.}^{film}$ 2.9 (OH), 3.0 (≡C—H), 4.7 (C≡C), 5.88–5.95μ (broad C=O)

NMR 6.35 ,C₁₇–H); 9.16 τ (C₁₈–CH₃ propyl—CH₃ shoulder). This product is used without further purification in the procedure of Example 21A.

EXAMPLE 21

Conversion of 10β-n-propyl-4,5-seco-3-estryn-17β-ol-5-one to 10β-n-propyl-4-estren-17β-ol-3-one (A) 10β - n - propyl-4,5-seco-estran-17β-ol-3,5-dione.—Treat 10β-n-propyl-4,5-seco-3-estryn-17β-ol-5-one in 90% aqueous dioxane with mercuric oxide in trifluoroacetic acid and isolate the resultant product in a manner similar to that described in Example 15B to obtain 10β-n-propyl-4,5-seco-estran-17β-ol-3,5-dione.

$\lambda_{max.}^{film}$ 2.84 (OH), 5.85μ

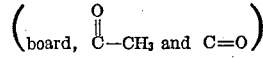

NMR 6.4 (C₁₇—H), 7.19 (C₁₇—acetate),

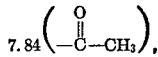

9.18 (C₁₈—CH₃), 9.12τ (center of propyl CH₃ triplet). This product was used without further purification for the procedure of the following Example 21B.

(B) 10β-n-propyl-4-estren-17β-ol-3-one.—Treat 10β-n-propyl-4,5-seco-estran-17β-ol-3,5-dione with t-butoxide in t-butanol and isolate the resultant product in a manner similar to that described in Example 6B to obtain 10β-n-propyl-4-estren-17β-ol-3-one. Purify the product by chromatography on 8 x 8″ 1 mm. thick Si-GF plate utilizing as solvent system chloroform-ethyl acetate (1:1). Extract the 10β-n-propyl-4-estren-17β-ol-3-one from the Si-GF with chloroform, evaporate the chloroform and crystallize the resultant product from methylene chloride-hexane. To obtain an analytical sample recrystallize several times from methylene chloride-hexane, M.P. 150–151° C.;

$\lambda_{max.}^{Nujol}$ 2.9 (OH), 6.02 (C=O), 6.20μ (C=C)

NMR 4.20 (C₄—H), 6.35 (C₁₇—H), 4.7 (OH), 9.19τ (C₁₈—CH₃).

EXAMPLE 22

Conversion of 4,5-seco-3-estryn-17β-ol-5-one 17-tetrahydropyranyl ether to 6,10β-di-(2′-propenyl)-4,5-seco-3-estryn-17β-ol-5-one 17-tetrahydropyranyl ether In a manner similar to that described in Example 20B, treat 4,5-seco-3-estryn-17β-ol-5-one 17-tetrahydropyranyl ether (compound of Example 20A) with sodium hydride in refluxing tetrahydrofuran for 12 hours followed by treatment with an excess of 3-bromo-1-propene. (This procedure is carried out in refluxing tetrahydrofuran, whereas the procedure of Example 20B is carried out at room temperature.) Isolate the resultant product in a manner similar to that described in Example 20B to obtain 6,10β-di-(2′-propenyl) - 4,5 - seco - 3 - estryn-17β-ol-5-one 17-tetrahydropyranyl ether. Purify by chromatographing on silica gel eluting with benzene-ether (20:1) and distilling the combined eluates to give 6,10β-di-(2′-propenyl)-4,5-seco-3-estryn-17β-ol-5-one 17-tetrahydropyranyl ether.

$\lambda_{max.}^{film}$ 3.0 (≡C—H), 4.70 (C≡C), 5.78 (C=O). 3.25, 6.1, 10.9μ

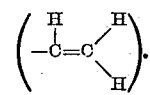

NMR: 4.9, 4.0→5.25

5.25→5.50, 5.85→6.75 (OTHP, $C_{17}$—H), 9.11 and 9.13τ ($C_{18}$—$CH_3$)

EXAMPLE 23

Conversion of 6,10β-di-(2′-propenyl)-4,5-seco-3-estryn-17β-ol-5-one 17-tetrahydropyranyl ether to 6,10β-di-(2′-propenyl)-4-estren-17β-ol-3-one (A) 6,10β-di-(2′-propenyl)-4,5-seco - estran - 17β - ol-3,5-dione.—In a manner similar to that described in Example 9A, treat 6,10β-di-(2′-propenyl)-4,5-seco-3-estryn-17β-ol-5-one 17-tetrahydropyranyl ether (compound of Example 22A) with mercuric oxide and trifluoroacetic acid in 90% aqueous dioxane followed by treatment with 12 N hydrochloric acid to obtain 6,10β-di-(2′-propenyl)-4,5-seco-estran-17β-ol-3,5-dione. Purify the resultant product, isolate in the manner described in Example 9A by chromatography on Florisil eluting with benzene-ether (1:3) and distill the eluates in vacuo to a residue comprising 6,10β-di-(2-propenyl)-4,5 - seco - estran - 17β-ol-3,5-dione. Prepare an analytical sample by sublimation at 105° and 2×10⁻⁵ mm. Product is an oil. $[\alpha]_D = -28.5°$.

$\lambda_{max}^{film}$ 2.9 (OH), 5.88 (2C=O), 3.22, 6.10, 10.9μ

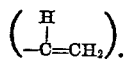

NMR 4.87 and 4.0→5.25

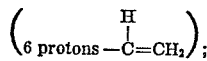

6.35 ($C_{17}$—H);

7.88 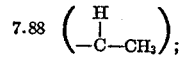

9.17τ ($C_{18}$—$CH_3$)

(B) 6,10β-di-(2′ - propenyl)-4-estren-17β-ol-3-one.—In a manner similar to that described in Example 9B, treat 6,10-di-(2′-propenyl)-4,5 - seco - estran - 17β-ol-3,5-dione with potassium tertiary butoxide in t-butanol to obtain 6,10-di-(2′-propenyl)-4-estren-17β-ol-3-one. Isolate the resultant product in a manner similar to that described in Example 9B and purify by thin layer chromatography on 8 x 8″ 1 mm. Si-GF plates utilizing as solvent system chloroform-ethyl acetate (1:1) to give 6,10β-di-(2′-propenyl)-4-estren-17β-ol-3-one. The product is an oil. $[\alpha]_D$ 18.7°.

$\lambda_{max}^{film}$ 2.9 (OH), 5.9–6.1 (broad C=O), 3.25, 6.24 10.9μ

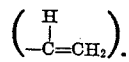

NMR 4.13 ($C_4$—H), 4.84, 4.87/4.0→5.25

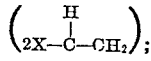

6.35 ($C_{17}$—H), 7.24 ($C_{17}$—OH); 9.18τ ($C_{18}$—$CH_3$)

EXAMPLE 24

Conversion of 6,10β-di-(2′-propenyl)-4,5-seco-3-estryn-17β-ol-5-one 17-tetrahydropyranyl ether to 6,6,10β-tri-(2′-propenyl)-4,5-seco-estran-17β-ol-3,5-dione (A) 6,6,10β-tri-(2′-propenyl)-4,5-seco - 3 - estryn-17β-ol-5-one 17-tetrahydropyranyl ether.—To a slurry of 1.8 g. 62.4% sodium hydride (in mineral oil) in 20 ml. dry tetrahydrofuran, add a solution of 840 mg. of 6,10β-di-(2′-propenyl)-4,5-seco-3-estryn-17β - ol-5-one 17-tetrahydropyranyl ether in 40 ml. tetrahydrofuran. Stir the mixture at room temperature for 24 hours, then add 14 ml. of 3-bromo-1-propene and then heat the reaction mixture at reflux temperature for 72 hours. Add 50 ml. of water dropwise at first, to decompose excess sodium hydride, then extract the oily suspension with chloroform. Wash the combined chloroform extracts with water, dry over sodium sulfate and evaporate in vacuo to a residue (1.44 g., containing mineral oil). Dissolve the residue in benzene and chromatograph on 40 g. silica gel eluting with benzene-ether (9:1). Evaporate the combined eluates to a residue (884 mg.) comprising 6,6,10β-tri-(2′-propenyl)-4,5-seco-3-estryn-17β-ol-5-one 17-tetrahydropyranyl ether as an oil.

$\lambda_{max}^{film}$ 2.98 (≡C—H), 5.92 (C=O), 3.22, 6.08, 10.95μ

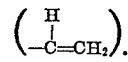

NMR 4.9 and 4.0→5.25

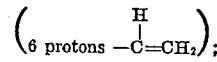

5.25→5.50, 5.85→6.75 (OTHP, $C_{17}$—H); 9.11 and 9.13τ ($C_{18}$—$CH_3$)

(B) 6,6,10β-tri-(2′-propenyl)-4,5 - seco - estran-17β-ol-3,5-dione.—In a manner similar to that described in Example 9A, treat 6,6,10β-tri-(2′-propenyl)-4,5-seco-3-estryn-17β-ol-5-one 17-tetrahydropyranyl ether with mercuric oxide and trifluoroacetic acid in 90% aqueous dioxane followed by treatment with 12 N hydrochloric acid. Isolate the resultant product in a manner similar to that described to obtain 6,6,10β-tri-(2′-propenyl)-4,5-seco-3-estryn-17β-ol-3,5-dione. Purify by chromatographing the residue on silica gel eluting with benzene-ether (20:1). Evaporate the combined eluates to a residue comprising 6,6,10β-tri-(2′-propenyl)-4,5 - seco - estran-17β-ol-3,5-dione. Prepare an analytical sample by sublimation at 110° C. and 2×10⁻⁵ mm. Hg to obtain an oil. $[\alpha]_D$ −7.1.

$\lambda_{max}^{film}$ 3.0 (OH); 5.8–5.95

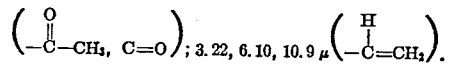

; 3.22, 6.10, 10.9 μ

NMR 4.88 and 4.0→5.25

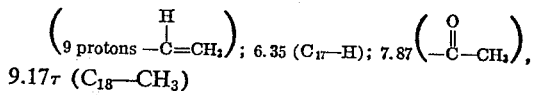

; 6.35 ($C_{17}$—H); 7.87

9.17τ ($C_{18}$—$CH_3$)

EXAMPLE 25

Conversion of 4,5-seco-3-estryn-17β-ol-5-one 17-tetrahydropyranyl ether to 10β-dodecyl-4-estren-17β-ol-3-one (A) 6-formyl-4,5-seco-3 - estryn-17β-ol-5-one 17-tetrahydropyranyl ether.—To a solution of 3.1 g. of 4,5-seco-3-estryn-17β-ol-5-one 17-tetrahydropyranyl ether (the compound of Example 20A) in 125 ml. of benzene, add in three portions 6.4 g. sodium methoxide in 125 ml. benzene. Cool the reaction mixture in a cold water bath and add dropwise an excess (25 ml.) of ethyl formate. Stir the reaction mixture for three hours, then dilute the solution with benzene to a volume of 200 ml. and extract with four 100 ml. portions of 4% aqueous sodium hydroxide. Acidify the combined basic extracts with 3% aqueous hydrochloric acid. Extract the resultant precipitate into 300 ml. chloroform then wash the combined chloroform extracts with three 150 ml. portions of water. Dry the chloroform solution over sodium sulfate and evaporate in vacuo to a residue (2.85 g.) comprising 6-formyl-4,5-seco-3-estryn-17β-ol-5-one 17-tetrahydropyranyl ether.

$\lambda_{max}^{film}$ 3.0 (≡C—H); 4.7 (—C≡C—), 6.1 (broad C=O); 6.3μ (broad C=O)

This compound is used without further purification in the reaction of Example 25B immediately following.

(B) 6-n-butylthiomethylene-4,5-seco - 3 - estryn-17β-ol-5-one 17-tetrahydropyranyl ether.—To a solution of 2.85 g. 6-formyl-4,5-seco-3-estryn-17β-ol-5-one 17-tetrahydropyranyl ether in 150 ml. of benzene, add 60 mg. p-toluenesulfonic acid and 1.5 ml. n-butyl mercaptan. Heat the reaction mixture at reflux temperature for 3 hours and continuously remove water by means of a Soxhlet extractor utilizing calcium carbide as drying agent. Cool the reaction mixture to room temperature, dilute with benzene to a volume of 250 ml., then wash the benzene solution three times with aqueous sodium bicarbonate solution and then with water. Dry the benzene solution over sodium sulfate and remove the solvent in vacuo to a residue (3.14 g.) comprising 6-n-butylthiomethylene-4,5-seco-3-estryn-17β-ol-5-one in admixture with the corresponding 17-tetrahydropyranyl ether. Convert the product to the tetrahydropyranyl ether by treatment thereof with dihydropyran in benzene in the presence of p-toluenesulfonic acid in a manner described in Example 20A. Isolate the product in the manner described and purify by chromatography on 200 g. Florisil eluting first with benzene-ether (50:1) and then with benzene-ether (25:1). Evaporate the combined eluates to a residue (1.1 g.) comprising 6-n-butylthiomethylene-4,5-seco-3-estryn-17β-ol-5-one 17-tetrahydropyranyl ether as an oil.

$\lambda_{max.}^{film}$ 3.0 (≡C—H); 4.7 (C≡C); 6.05μ (C=O). NMR 2.67

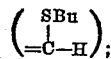

5.30→5.60, 5.85→6.85 (OTHP, C$_{17}$—H); 9.18 and 9.20τ (C$_{18}$—CH$_3$)

This compound is used without further purification in the reaction of Example 25C immediately following.

(C) 6-(n-butylthiomethylene) - 10β - (n-dodecyl)-4,5-seco-3-estryn-17β-ol-5-one.—To a solution of 1.41 g. of 6-(n-butylthiomethylene)-4,5-seco-3-estryn-17β-ol-5-one 17-tetrahydropyranyl ether in 120 ml. dry t-butanol, add 700 mg. potassium tertiary butoxide in three portions. Stir the reaction mixture at room temperature for 30 minutes, then add 15 ml. n-dodecyl iodide in one portion. Stir the mixture for 36 hours at 50° C., then pour into 300 ml. water. Extract the resulting suspension into chloroform and wash the combined chloroform extracts with water, dry over sodium sulfate and remove the solvent in vacuo to a residue. Chromatograph the residue on 150 g. of Florisil eluting with hexane (to remove the excess n-dodecyl iodide) followed by benzene-ether (9:1). Evaporate the combined benzene-ether eluates to a residue (270 mg.) comprising 6-(n-butylthiomethylene)-10β-(n-dodecyl)-4,5-seco - 3 - estryn-17β-ol-5-one, as an oil.

$\lambda_{max.}^{film}$ 2.9 (OH); 3.0 (≡C—H); 4.7 (C≡C);

6.05μ (C=O). NMR 2.67

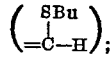

5.30→5.60, 5.85→6.85 (OTHP, C$_{17}$—H); 9.18 and 9.20τ (C$_{18}$—H$_3$)

This compound is used without further purification in the procedure of Example 25D immediately following.

(D) 6-(n-butylthiomethylene)-10β-(n - dodecyl) - 4,5-seco-estran-17β-ol-3,5-dione.—Treat 6-(n-butylthiomethylene)-10β-(n-dodecyl) - 4,5 - seco-3-estryn-17β-ol-5-one with mercuric oxide and trifluoroacetic acid in 90% aqueous dioxane in a manner similar to that described in Example 15B. Isolate the resultant product in a manner similar to that described to obtain 6-(n-butylthiomethylene)-10β-(n-dodecyl) - 4,5 - seco-estran-17β-ol-3,5-dione as and oil.

$\lambda_{max.}^{film}$ 2.88 (OH); 5.85

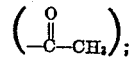

6.02 (C=O). NMR 2.5

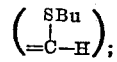

6.42 (multiplet C$_{17}$—H); 7.86

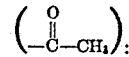

8.73 (broad-(CH$_2$)$_{11}$—); 920τ (C$_{18}$—CH$_3$

This compound was homogeneous by thin layer chromatographic analysis (Si-GF, chloroform-ethyl acetate (1:1).

This compound is used without further purification of the procedure of Example 25E immediately following.

(E) 6-(n-butylthiomethylene) - 10β - (n - dodecyl)-4-estren-17β-ol-3-one.—In a manner similar to that described in Example 14C, treat 6-(n-butylthiomethylene)-10β-(n-dodecyl)-4,5-seco-estran-17β-ol-3,5-dione with potassium tertiary butoxide in t-butanol. Isolate the resultant product in a manner similar to that described to obtain 6 - (n - butylthiomethylene) - 10β - (n-dodecyl)-4-estren-17β-ol-3-one as an oil.

$\lambda_{max.}^{film}$ 2.86 (OH); 6.0μ (broad C=O).

NMR 3.43

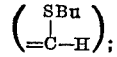

3.98 (C$_4$—H); 6.43 (multiplet C$_{17}$—H); 8.73 (broad—(CH$_2$)$_{11}$—); 9.20τ (C$_{18}$—CH$_3$)

This compound is used without further purification in the example of 25F immediately following.

(F) 10β-n-dodecyl-4-estren-17β-ol-3-one.—To a solution of 310 mg. of 6-(n-butylthiomethylene)-10β-(n-dodecyl)-4-estren-17β-ol-3-one in 60 ml. 90% aqueous dioxane, add 6 ml. concentrated hydrochloric acid. Stir the mixture at 80° C. for 16 hours, then pour into 200 ml. cold water. Extract the resulting suspension with three 100 ml. portions of chloroform, wash the combined chloroform extracts with several portions of aqueous sodium bicarbonate solution and then with water. Dry the chloroform extracts over sodium sulfate and remove the solvent in vacuo to a residue (252 mg.). Chromatograph the residue on 5 g. Florisil eluting with benzene-ether (5:1). Evaporate the combined eluates to a residue (55 mg.) comprising 10β-n-dodecyl-4-estren-17β-ol-3-one as an oil.

$\lambda_{max.}^{film}$ 2.86 (OH); 6.0 (C≡O); 6.22μ (C=C).

NMR 4.2 (C$_4$—H); 4.4 (multiplet C$_{17}$—H); 8.75 (broad —(CH$_2$)$_{11}$—); 9.21τ (C$_{18}$—CH$_3$).

EXAMPLE 26

Conversion of 4,5-seco-3-androstyn-17β-ol-5-one 17-tetrahydropyranyl ether to androstan-17β-ol-3-one (A) 4,5-seco - 3 - androstyn-5β,17β-diol 17-tetrahydropyranyl ether.—Cool a solution of 6.8 g. of 4,5-seco-3-androstyn-17β-ol-5-one 17-tetrahydropyranyl ether in 500 ml. of methanol to 0° C., then add in three portions 1.1 g. of sodium borohydride. Stir the reaction mixture at 0° C. for three hours, then pour into 500 ml. cold water. Add sodium bicarbonate to the resulting suspension, then extract into three 150 ml. portions of chloroform. Wash the combined chloroform extracts with water, dry over sodium sulfate, then evaporate in vacuo to a residue (7.3 g.). Chromatograph the residue on 200 g. Florisil eluting with benzene-ether (50:1). Distill the combined eluates to a residue (5.04 g.) comprising 4,5-seco-3-androstyn-5β,17β-diol 17-tetrahydropyranyl ether as an oil.

$\lambda_{max.}^{film}$ 2.85 (OH); 3.0 (C≡C—H); 4.74μ (C≡C)

NMR 5.25→5.50, 5.85→6.75 (OTHP, C$_5$—H and C$_{17}$—H);

9.15 and 9.18 (C$_{18}$—CH$_3$); 9.24τ (C$_{18}$—CH$_3$). This compound is used without further purification in the procedure of following Example 26B.

(B) 4,5-seco-3-androstyn-5β,17β-diol 5 - p-toluenesulfonate 17-tetrahydropyranyl ether.—To a solution of 2 g. of 4,5-seco-3-endrostyn-5β,17β-diol 17-tetrahydropyranyl ether in 100 ml. dry pyridine, add an excess (5 g.) of p-toluenesulfonyl chloride. Stir the mixture at 60° C. for 16 hours, then pour into 200 ml. cold water. Extract the resulting suspension into three 100 ml. portions of chloroform. Wash the combined chloroform extracts with aqueous sodium bicarbonate, then with water. Dry the chloroform solution over sodium sulfate and evaporate in vacuo to a residue (2.24 g.) comprising a mixture of 4,5-seco-3-androstyn-5β,17β-diol 5-p-toluenesulfonate 17 - tetrahydropyranyl ether, together with the corresponding 5,17-ditosylate. Isolate and purify by chromatographing the mixture on 100 g. of Florisil eluting with benzene-ether (50:1). Evaporate the combined eluates to a residue (420 mg.) comprising 4,5-seco-3-androstyn - 5β,17β - diol 5-p-toluenesulfonate 17-tetrahydropyranyl ether.

$\lambda_{max.}^{film}$ 3.0 ($\equiv$C—H); 4.7 (C$\equiv$C); 6.24 μ (OTS).
NMR 2.35, 2.84 (4 protons, 2 doublets, j=9 c.p.s. OTS); 5.25–5.50, 5.85–6.75 (OTHP, $C_5$—H and $C_{17}$—H); 6.73 (OTS—$CH_3$); 9.15, 9.18 ($C_{18}$—$CH_3$); 9.27τ ($C_{18}$—$CH_3$). This compound is unstable on standing and must be used immediately in the following reaction of Example 26C.

(C) 3-androstene-3,17β-diol 3-trifluoroacetate.—Stir at room temperature for 1.5 hours a solution of 93 mg. of freshly prepared 4,5 - seco-3-androstyne-5β,17β-diol 5-p-toluenesulfonate 17-tetrahydropyranyl ether in 10 ml. trifluoroacetic acid. Pour the reaction mixture into 100 ml. cold water and extract the resulting suspension into three 80 ml. portions of chloroform. Wash the combined chloroform extracts with aqueous sodium bicarbonate solution, then with water and dry over sodium sulfate. Evaporate the chloroform in vacuo to a residue (77 mg.) comprising 3-androstene-3,17β-diol 3-trifluoroacetate.

$\lambda_{max.}^{film}$ 2.9 (OH); 5.55μ

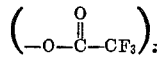

This compound is used without further purification in the procedure of following Example 26D.

(D) Androstan-17β-ol-3-one.—To a solution of 75 mg. 3-androstene-3,17β-diol 3-trifluoroacetate in 20 ml. of methanol, add 10 mg. sodium methoxide. Stir the reaction mixture at room temperature for 16 hours, then add 5 ml. 3% hydrochloric acid and continue stirring for 10 minutes. Pour the reaction mixture into 100 ml. cold water and extract the resulting white suspension into three 80 ml. portions of chloroform. Wash the combined chloroform extracts with water, dry over sodium sulfate and evaporate in vacuo to a residue (60 mg.). Chromatograph the residue on an 8 x 8″ 1 mm. thick Si-GF plate utilizing as solvent system benzene-ether (1:1). Extract the main product from the Si-GF plate with chloroform, then evaporate the chloroform to a residue (21 mg.) comprising androstan-17β-ol-3-one in admixture with 5β-androstan-17β-ol-3-one. Purify by sublimation at 75° C. and 2×10⁻⁵ mm. Hg.

$\lambda_{max.}^{Nujol}$ 2.85 (OH); 5.85μ (C=O).

EXAMPLE 27

4,5-oxide-17α,20-isopropylidenedioxy-pregnan-3-one

To a stirred solution of 5 g. of 17α,20-isopropylidenedioxy-4-pregnen-3-one in 350 ml. of methanol cooled to 0° C., add dropwise simultaneously 3 ml. of a 10% sodium hydroxide solution and 9 ml. of 30% hydrogen peroxide. Regulate the rate of addition so that the reaction temperature does not exceed 3° C. and so that the addition of both solutions is completed at the same time. Stir the reaction mixture for 48 hours at 0° C., then pour into 3 liters of ice-saturated sodium chloride solution. Extract with three 1 liter portions of chloroform, then wash the combined chloroform extracts with a 5% aqueous sodium bicarbonate solution, then with water. Dry over sodium sulfate and evaporate the chloroform in vacuo to a residue. Dissolve the residue in benzene and chromatograph on 175 g. of silica gel-G eluting with benzene-2.5% ether. Evaporate the combined benzene ether eluates to a residue (3.3 g.) comprising 4,5-oxido - 17α,20 - isopropylidenedioxy-pregnan-3-one. Prepare an analytical sample by sublimation at 70° C. and 10⁻⁴ mm., M.P. 73–79° [α]$_D$ 48 (CHCl$_3$)

$\lambda_{max.}^{Nujol}$ 5.85μ (C=O).

EXAMPLE 28

Conversion of 4,5-seco-3-estryn-17β-ol - 5 - one to 6-(n-butylthiomethylene)-testosterone 17-acetate (and of 4,5-seco-3-androstyn-17β-ol-5-one to 6-(n-butylthiomethylene)-testosterone 17-acetate)

(A) 6 - formyl-4,5-seco-3-estryn-17β-ol-5-one and the C-19 analog thereof.—(1) In a manner similar to that described in Example 25A, treat 4,5-seco-3-estryn-17β-ol-5-one (the compound of Example 16) with ethyl formate and sodium methoxide in benzene followed by acidification and isolation of the product thereby formed to yield 6-formyl-4,5-seco-3-estryn-17β-ol-5-one (product 33A–1).

$\lambda_{max.}^{film}$ 2.9 (OH); 3.0 ($\equiv$C—H); 4.7 (—C$\equiv$C—); 6.1 (C=O); 6.3 (C=O)

This product is used without further purification in the procedure of Example 28B–1.

(2) In a similar manner (i.e. as described in Example 25A), treat 4,5-seco-3-androstyn-17β-ol-5-one (the compound of Example 1) with ethyl formate and sodium methoxide in benzene followed by acidification and isolation of the product thereby formed to obtain 6-formyl-4,5-seco-3-androstyn-17β-ol-5-one (product 33A–2).

$\lambda_{max.}^{film}$ 2.9 (OH); 3.0 ($\equiv$C—H); 4.7 (C$\equiv$C); 6.1 (C=O!) 6.3μ (C=O)

This product is used without further purification in the procedure of Example 28C–2.

(B) 6-(n-butylthiomethylene)-4,5-seco-3-estryn-17β-ol-5-one.—(1) To a solution of 1 g. of 6-formyl-4,5-seco-3-estryn-17β-ol-5-one in 60 ml. of benzene, add 20 mg. p-toluenesulfonic acid and 0.5 ml. n-butyl mercaptan. Heat the reaction mixture for 35 hours at reflux temperature in a reaction vessel equipped with a Soxhlet extractor (calcium carbide as drying agent) under an atmosphere of nitrogen. Cool the reaction mixture to room temperature, dilute with benzene to a volume of 100 ml., then wash the organic solution with aqueous sodium bicarbonate solution and dry over sodium sulfate. Evaporate the solvent in vacuo to a residue (1.1 g.) comprising 6-(n-butylthiomethylene)-4,5-seco-3-estryn-17β-ol-5-one as an oil.

$\lambda_{max.}^{film}$ 2.9 (OH); 3.0 ($\equiv$C—H); 4.7 (—C$\equiv$C—); 6.05μ (C=O)

This product is used without further purification in the procedure of Example 28C which immediately follows.

(C) 6 - (n - butylthiomethylene)-4,5-seco-3-androstyn-17β-ol-5-one.—(1) To a solution of 1.1 g. 6-(n-butylthiomethylene)-4,5-seco-3-estryn-17β-ol-5-one in 50 ml. of dry t-butanol, add 1.3 g. of potassium tertiary butoxide. Stir the reaction mixture at room temperature under an atmosphere of nitrogen for 5 minutes, then add an excess (10 ml.) of methyl iodide and stir at 40° C. for 16 hours. Distill most of the solvent from the reaction mixture in vacuo and dissolve the resultant residue in 100 ml. of chloroform. Wash the chloroform solution with water and dry over sodium sulfate. Evaporate the solvent in vacuo and chromatograph the resultant residue (1.2 g.) on 50 g. of Florisil eluting with benzene-ether (20:1). Distill the combined eluates to a residue (610 mg.) comprising 6 - (n-butylthiomethylene)-4,5-seco-3-androstyn-17β-ol-5-one (product 28C–1) as an oil. [α]$_D$ +11° (CHCl$_3$).

$\lambda_{max.}^{film}$ 2.9 (OH); 3.0 ($\equiv$C—H); 4.7 (—C$\equiv$C—); 6.0μ (C=O)
NMR 2.47

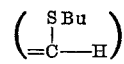

4.3 ($C_{17}$—H); 8.94 ($C_{18}$—$CH_3$); 9.20τ ($C_{18}$—$CH_3$)

(2) Alternatively the compound of this example is prepared as follows. In a manner similar to that described in Example 28B–1, treat 6-formyl-4,5-seco-3-androstyn-17β-ol-5-one with n-butyl mercaptan in benzene in the presence of p-toluenesulfonic acid. Isolate the resultant product in a manner similar to that described to obtain 6-(n-butylthiomethylene) - 4,5-seco-3-androstyn-17β-ol-5-one. This product is identical with that obtained in Example 28C–1 as determined by thin layer chromatographic data (Si-GF benzene-ether (1:1)) and by spectroscopic data.

(D) 6 - (n - butylthiomethylene)-testosterone 17-acetate.—In a manner similar to that described in Example 4A—procedure 1, treat 6 - (n-butylthiomethylene)-4,5-seco-3-androstyn-17β-ol-5-one with mercuric acetate and concentrated sulfuric acid. Isolate the resultant product in the manner described to obtain 6-(n-butylthiomethylene)-testosterone 17-acetate. Purify by chromatography on 8 x 8" 1 mm. thick Si-GF plates utilizing as solvent system benzene-ether (1:1). Extract the product from the Si-GF plates with chloroform. Evaporate the combined chloroform eluates to a residue comprising 6-(n-butylthiomethylene)-testosterone 17-acetate.

$\lambda_{max}^{film}$ 5.78

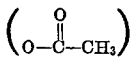

6.02μ (C=O). NMR 3.66

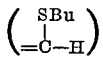

4.19 (C₄—H); 5.4 (C₁₇—H); 7.97

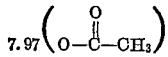

8.92 (C₁₉—CH₃); 9.17τ (C₁₈—CH₃)

EXAMPLE 29

10β-n-propyl-4,5-seco-3-estryne-5,17-dione and conversion thereof to 10β-n-propyl-4-esterne-3,17-dione (i.e. 19-ethyl-4-androstene-3,17-dione)

(A) 10β - n-propyl-4,5-seco-3-esteryne-5,17-dione.—In a manner similar to that described in Example 12A, treat 10β - n-propyl-4,5-seco-3-estryn-17β-ol-5-one (compound of Example 20C) with chromium trioxide in acetone. Isolate and purify the resultant product in a manner similar to that described to obtain 10β-n-propyl-4,5-seco-3-estryne-5,17-dione.

(B) 10β-n-propyl-4-estrene-3,17-dione.—In a manner similar to that described in Example 4, procedure 1, treat 10β-n-propyl-4,5-seco-3-estryne-5,17-dione in acetic acid with mercuric acetate and concentrated sulfuric acid to obtain 10β-n-propyl-4-estrene-3,17-dione.

EXAMPLE 30

2-, 7-, and 17-methyl analogs of 4,5-seco-3-androstyn-17β-ol - 5 - one and 4,5-seco-3-estryn-17β-ol-5-one and alkylated derivatives derived therefrom (A) In a manner similar to that described in the procedures of Example 27 and Example 1, treat each of the following testosterone derivatives with alkaline hydrogen peroxide followed by treatment of the thereby produced 4,5-oxido derivatives with p-toluenesulfonylhydrazine in ethanol:

(1) 17α-methyltestosterone
(2) 17α-methyltestosterone 17-acetate
(3) 17α-methyl-19-nor-testosterone
(4) 17α-methyl-19-nor-testosterone acetate
(5) 2α-methyltestosterone
(6) 2α-methyltestosterone 17-acetate
(7) 2α-methyl-19-nor-testosterone
(8) 2α-methyltestosterone 17-acetate
(9) 7α-methyltestosterone
(10) 7α-methyltestosterone 17-acetate
(11) 7α-methyl-19-nor-testosterone
(12) 7α-methyl-19-nor-testosterone acetate Isolate and purify the resultant respective products in a manner similar to that described in Example 1 to obtain respectively, (1) 17α-methyl-4,5-seco-3-androstyn-17β-ol-5-one
(2) 17α-methyl-4,5-seco-3-androstyn-17β-ol-5-one 17-acetate
(3) 17α-methyl-4,5-seco-3-esteryn-17β-ol-5-one
(4) 17α-methyl-4,5-seco-3-estryn-17β-ol-5-one 17-acetate
(5) 2α-methyl-4,5-seco-3-androstyn-17β-ol-5-one
(6) 2α-methyl-4,5-seco-3-androstyn-17β-ol-5-one 17-acetate
(7) 2α-methyl-4,5-seco-3-estryn-17β-ol-5-one
(8) 2α-methyl-4,5-seco-3-estryn-17β-ol-5-one 17-acetate
(9) 7α-methyl-4,5-seco-3-androstyn-17β-ol-5-one
(10) 7α-methyl-4,5-seco-3-androstyn-17β-ol-5-one 17-acetate
(11) 7α-methyl-4,5-seco-3-estryn-17β-ol-5-one
(12) 7α-methyl-4,5-seco-3-estryn-17β-ol-5-one 17-acetate.

(B) Alkylation of 4,5-seco compounds at C–6.—By subjecting the 4,5-seco-3-androstyne products (2), (6) and (10) listed above to alkylating procedures such as described in Examples 10A and 15A, there are obtained respectively the 6,6-pentamethylene-, the 6,6-dimethyl-, and the 6,6-ethylene derivatives of 17α-methyl-4,5-seco-3-androstyn-17β-ol-5-one 17-acetate, 2α-methyl-4,5-seco-3-androstyn-17β-ol-5-one 17-acetate and 7α-methyl-4,5-seco-17β-ol-5-one 17-acetate. By treating each of the foregoing 6,6-disubstituted 4,5-seco compounds according to procedures similar to those described in Examples 9A and 9B, there are obtained respectively, (1) 6,6-pentamethylene-17α-methyltestosterone 17-acetate
(2) 6,6,17-trimethyltestosterone 17-acetate
(3) 6,6-ethylene-17α-methyltestosterone 17-acetate
(4) 2α-methyl-6,6-pentamethylenetestosterone 17-acetate
(5) 2α-methyl-6,6-trimethyltestosterone 17-acetate
(6) 2α-methyl-6,6-ethylenetestosterone 17-acetate
(7) 6,6-pentamethylene-7α-methyltestosterone 17-acetate
(8) 6,6,7α-trimethyltestosterone 17-acetate
(9) 6,6-ethylene-7α-methyltestosterone 17-acetate (C) Alkylation of 4,5-seco compounds at C–10.—Treat each of the 4,5-seco-3-estryne products in Example 30A identified under Nos. (4), (8) and (12) with sodium hydride in tetrahydrofuran followed by n-propyl iodide according to the procedure of Example 20B to obtain respectively, 10β-n-propyl-17α-methyl-4,5-seco-3-androstyn-17β-ol-5-one 17-acetate, 2α-methyl-10β-n-propyl-4,5-seco-3-androstyn-17β-ol-5-one, and 7α-methyl-10β-n-propyl-4,5-seco-3-androstyn-17β-ol-5-one 17-acetate.

(D) By treating each of the foregoing 10β-n-propyl derivatives in a manner similar to that described in Examples 9A and 9B, there are obtained respectively, 10β-n-propyl-17α-methyl-19-nor - testosterone 17 - acetate, 2α-methyl-10β-n-propyl-19-nor-testosterone 17-acetate and 7α-methyl-10β-n-propyl-19-nor-testosterone 17-acetate.

I claim:
1. A compound having the following formula:

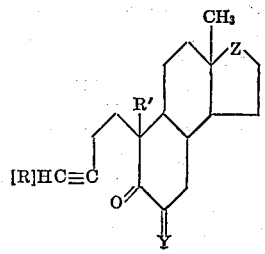

wherein
R' is a member selected from the group consisting of hydrogen and alkyl having up to 12 carbon atoms, said alkyl radical being saturated or unsaturated;
Y is a member selected from the group consisting of

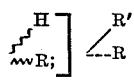

polymethylene having from 2 to 5 carbon atoms (H,β-formyl), and n-lower alkylthiomethylene; and
Z is a member selected from the group consisting of keto, and

W being a member selected from the group consisting of hydrogen, tetrahydropyranyl, lower alkanoyl, and A being a member selected from the group consisting of hydrogen and lower alkyl.

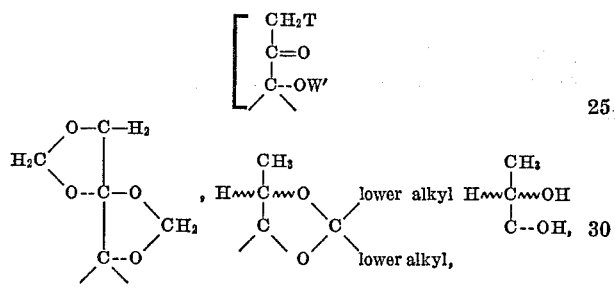

and

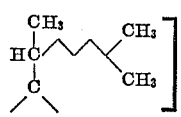

2. A compound according to claim 1 wherein Y is

3. A compound according to claim 1 wherein Z is

4. A compound according to claim 1 wherein Y is

R' is alkyl having up to 3 carbon atoms and Z is

5. A compound according to claim 1 wherein R' and Y are each alkyl having up to 3 carbon atoms, and Z is

6. A compound according to claim 1 wherein R' is alkyl having up to 3 carbon atoms, Y is

with each R' being an alkyl radical having up to 3 carbon atoms, and Z is

7. A compound according to claim 1 wherein R' is hydrogen, Y is

and Z is

said compound being 4,5-seco-3-estryn-17β-ol-5-one.

8. A compound according to claim 1 wherein R' is methyl, Y is pentamethylene and Z is

said compound being 6,6-pentamethylene - 4,5 - seco-3-androstyn-17β-ol-5-one.

9. A compound according to claim 1 wherein R' is hydrogen, Y is

and Z is keto, said compound being 4,5-seco-3-estryne-5,17-dione.

10. A compound according to claim 1 wherein Y is

R' is methyl, and Z is keto, said compound being 4,5-seco-3-androstyne-5,17-dione.

11. A compound according to claim 1 wherein R' is methyl, Y is

and Z is

said compound being 6,6-dimethyl-4,5-seco-3-androstyn-17β-ol-5-one 17-acetate.

12. A cimpound according to claim 1 wherein Y is

R' is n-propyl, and Z is

said compound being 10β-n-propyl-4,5-seco-3-estryn-17β-ol-5-one.

13. A compound accoridng to claim 1 wherein R' is 2'-propenyl, Y is

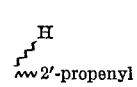

and Z is

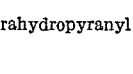

said compound being 6,10β-di-(2'-propenyl)-4,5-seco-3-estryn-17β-ol-5-one 17-tetrahydropyranyl ether.

14. A compound according to claim 1 wherein Y is

R' is methyl and Z is

said compound being 4,5-seco-3-androstyn-17β-ol-5-one.

15. A compound according to claim 1 wherein R' is methyl, Y is 6,6-di-(2'-propenyl) and Z is

said compound being 6,6-di-(2'-propenyl) - 4,5 - seco - 3-androstyn-17β-ol-3-one.

16. A compound according to claim 1 wherein R' is n-propyl, Y is

and Z is keto, said compound being 10β-n-propyl-4,5-seco-3-estryne-5,17-diene.

17. A compound according to claim 1 wherein R' is 2'-propenyl, Y is di-(2'-propenyl) and Z is

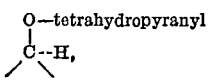

said compound being 6,6,10β-tri-(2'-propenyl)-4,5-seco-3-estryn-17β-ol-5-one 17-tetrahydropyranyl ether.

References Cited
UNITED STATES PATENTS 3,639,428  2/1072  Fried _____ 260—586 H X

OTHER REFERENCES

Wieland et al., "Chemical Abstracts," vol. 68 (1968), col. 13257t.

Tanabe et al., "Chemical Abstracts," vol. 68 (1968), col. 69183h.

Borrevang, et al., "Chemical Abstracts," vol. 70 (1969), col. 11881j.

Tanabe, et al., "Chemical Abstracts," vol. 70 (1969), col. 88108v.

DONALD G. DAUS, Primary Examiner

J. H. TURNIPSEED, Assistant Examiner

U.S. Cl. X.R.

260—239.55 C, 239.55 R, 340.9, 397.3, 397.4, 397.5, 488 B, 586 H; 424—238, 241, 242, 243, 278

PO-1050
(5/89)

UNITED STATES PATENT OFFICE
CERTIFICATE OF CORRECTION

Patent No. 3,796,728                    Dated  March 12, 1974

Inventor(s)  Masato Tanabe

It is certified that error appears in the above-identified patent and that said Letters Patent are hereby corrected as shown below:

Column 3, lines 65-75, Formula (I'd) should appear as follows

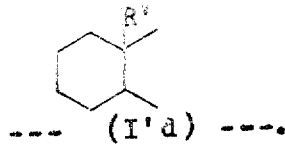

--- (I'd) ---.

Column 4, lines 20-25 should appear as follows

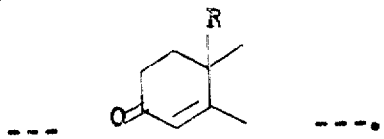

--- ---.

Column 6, line 30, "6-formyl-4,5-seco-3-estryn-17O-ol-5-ene-17-tetrahydro-" should read ---6-formyl-4,5-seco-3-estryn-17β-ol-5-one-17-tetrahydro---. Column 8, line 41, "and 4,5-set seco-19-nor" should read ---and 4,5-seco-19-nor---; lines 66-74, first formula should appear as follows

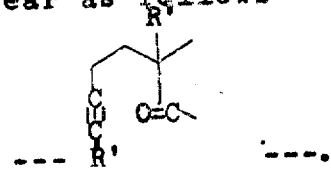

--- R' ---.

Column 9, line 19, "3-androstyn-17β-ol-one," should read ---3-androstyn-17β-ol-5-one,---; lines 35 and 36, "-3-androstyn-17β-5-one one" should read ----3-androstyn-17β-ol-5-one---. Column 11, line 52, "(Compound I, R=CH₃)" should read ---(compound I', R=CH₃)---. Column 14, line 68, "stirring at 50 C. for" should read ---stirring at 50°C. for---. Column 17, line 9, "9,11-seco-22α,25α-11-spirostyn-3β-ol-9-one 3-acetate" should read ---9,11-Seco-22α,25a-11-spirostyn-3β-ol-9-one 3-acetate---; lines 29 and 30, "9,11-seco-22α,25α-11-spirostyn-3β-ol-9-one 3-acetate" should read ---9,11-Seco-22α,25a-11-spirostyn-3β-ol-9-one 3-acetate---; line 40, "9,11-seco-22α,25α-11-" should read ---9,11-seco-22α,25a-11----; line 65, "from the Si-CF" should read ---from the Si-GF---. Column 19,

PO-1050
(5/69)

UNITED STATES PATENT OFFICE
CERTIFICATE OF CORRECTION

Patent No. 3,796,728          Dated March 12, 1974

Inventor(s) Masato Tanabe

It is certified that error appears in the above-identified patent and that said Letters Patent are hereby corrected as shown below:

lines 43 and 44, "8.70 ($C_{18}$-$CH_3$), $C_{18}$-$CH_3$)," should read ---8.70 ($C_{18}$-$CH_3$),---. Column 20, lines 7-12, " $\lambda_{max.}^{film}$ 3.0 and 4.7 (C≡CH) and 5.85 μ (C=O) Purify by chromatography...ether," should read ---Purify by chromatography...ether, $\lambda_{max.}^{film}$ 3.0 and 4.7 (C≡CH) and 5.85 μ (C=O)---. Column 21, lines 25-29, "and 5.9 μ (2 x-C=O). (-C=C$<^H_H$)" should read ---(-C=C$<^H_H$) and 5.9 μ (2 x-C=O).---; line 43, "comprising 6,6-di-2'-propenyl)" should read ---comprising 6,6-di-(2'-propenyl)---; line 59, "and 9.18 ($C_8$-3H)" should read ---and 9.18 ($C_{18}$-3H)---; line 60 should read --- $\lambda_{max.}^{MeOH}$ 245 mμ ($\epsilon$8700)---. Column 22, line 12, " $\lambda_{max.}^{MeOH}$ 245 mμ ($\epsilon$8700)" should not appear; line 61, "$C_{18}$-3H3;" should read ---($C_{18}$-3H);---; line 68, "Pour the reaction" should read ---Pour the reaction mixture into---. Column 23, lines 24 and 25, " $\lambda_{max.}^{Nujol}$ 3.0 (C≡CH), 4.7 (C≡C), 5.8 (C=O), NMR: 8.9 ($C_{10}$-3H) and 5.9 μ (C=O)" should read --- $\lambda_{max.}^{Nujol}$ 3.0 (C≡CH), 4.7 (C≡C), 5.8 (C=O), and 5.9 μ (C=O). nmr: 8.9 ($C_{18}$-3H) and 9.07$\tau$ ($C_{18}$-3H).---. Column 26, line 52, "with other" should read ---with ether---. Column 27, line 41, "(i.e. )" should read ---(i.e. 17-OTHP)---. Column 28, lines 9 and 10, "NMR 6.35 ,$C_{17}$-H); 9.16 ($C_{18}$-$CH_3$ propyl-$CH_3$ shoulder)" should read ---nmr 6.35 ($C_{17}$-H); 9.16 ($C_{18}$-$CH_3$ + propyl-$CH_3$ shoulder).---; line 26, "(board, $\overset{O}{\underset{C}{}}$-$CH_3$ and C=O)" should read ---(broad, $\overset{O}{\underset{C}{}}$-$CH_3$ and C=O)---. Column 29, line 36, "7.88 (-$\overset{}{\underset{C}{}}$-$CH_3$);" should read ---7.88 (-$\overset{}{\underset{C}{}}$-$CH_3$);---; line 53, "4.84, 4.87/4.0→5.25" should read ---4.84, 4.87 + 4.0→5.25---; lines 55 and 56, "(2X-$\overset{}{\underset{C}{}}$-$CH_2$);" should read ---(2X-$\overset{H}{\underset{C}{}}$=$CH_2$);---.

--2--

UNITED STATES PATENT OFFICE
CERTIFICATE OF CORRECTION

Patent No. 3,796,728  Dated March 12, 1974

Inventor(s) Masato Tanabe

It is certified that error appears in the above-identified patent and that said Letters Patent are hereby corrected as shown below:

Column 31, lines 54 and 55, "5.30→5.60, 5.85→6.85 (OTHP, $C_{17}$-H); 9.18 and 9.20T ($C_{18}$-H$_3$)" should read ---6.44 ($C_{17}$-H); 8.74 (broad-(CH$_2$)$_{11}$); 9.22 ($C_{18}$-CH$_3$)---. Column 35, lines 31-34, "7.97 7.97 (O-C(O)-CH$_3$)" should read ---7.97 (O-C(O)-CH$_3$);---

Column 36, lines 65-75, Claim 1 should appear as follows

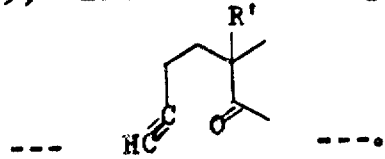

Column 37, lines 6-9, Claim 1 should appear as follows

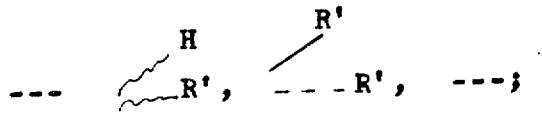

lines 13-16, Claim 1 should appear as follows

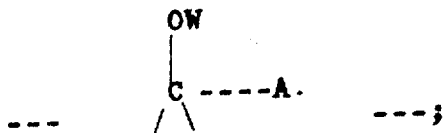

lines 21-39, bracketed portion shown in patent should not appear; line 71, "with each R' being an alkyl radical having up to 3 carbon" should read ---with each R' being alkyl having up to 3 carbon---. Column 38, line 46, Claim 12, "A cimpound" should read ---A compound---; line 59, Claim 13, "A compound accoridng" should read ---A compound according---. Column 39, line 20, Claim 16, "5,17-diene" should read ---5,17-dione---.

Signed and sealed this 8th day of October 1974.

(SEAL)
Attest:

McCOY M. GIBSON JR.
Attesting Officer

C. MARSHALL DANN
Commissioner of Patents